United States Patent
Takehara

(10) Patent No.: US 12,501,142 B2
(45) Date of Patent: Dec. 16, 2025

(54) IMAGING SYSTEM AND METHOD FOR CALCULATING DEAD ANGLE AND VISUAL RECOGNITION REGIONS OF SUBJECTS

(71) Applicant: JVCKENWOOD Corporation, Yokohama (JP)

(72) Inventor: Yuya Takehara, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 98 days.

(21) Appl. No.: 18/396,218

(22) Filed: Dec. 26, 2023

(65) Prior Publication Data
US 2024/0129615 A1    Apr. 18, 2024

Related U.S. Application Data

(63) Continuation of application No. PCT/JP2022/020742, filed on May 18, 2022.

(30) Foreign Application Priority Data

Jun. 28, 2021   (JP) .................. 2021-106685

(51) Int. Cl.
*H04N 23/611*   (2023.01)
*H04N 23/60*   (2023.01)
*H04N 23/69*   (2023.01)

(52) U.S. Cl.
CPC ........... *H04N 23/611* (2023.01); *H04N 23/64* (2023.01); *H04N 23/69* (2023.01)

(58) Field of Classification Search
CPC ...... H04N 23/611; H04N 23/64; H04N 23/69; H04N 23/61; H04N 23/60; H04N 23/635; G06T 7/70; G06T 7/73

(Continued)

(56) References Cited

U.S. PATENT DOCUMENTS 9,160,931 B2 * 10/2015 Robinson ............... H04N 23/60
11,170,578 B1 * 11/2021 Casaburo ................ G06T 7/277
(Continued)

FOREIGN PATENT DOCUMENTS

| JP | 2007331045 A | 12/2007 |
| JP | 2009010728 A | 1/2009 |

(Continued)

OTHER PUBLICATIONS

International Search Report and Written Opinion of PCT/JP2022/020742, dated Aug. 9, 2022.

*Primary Examiner* — Usman A Khan
(74) *Attorney, Agent, or Firm* — Procopio, Cory, Hargreaves & Savitch LLP

(57) ABSTRACT

An imaging system according to an embodiment includes an imaging unit configured to image a subject, a viewing angle acquiring unit configured to acquire viewing angle information of the subject using an image captured by the imaging unit, a subject information acquiring unit configured to acquire, using the image, position information and posture information of the subject and position information of an object present in a visual field region of the subject, and a region calculating unit configured to calculate, based on the viewing angle information, the position information, and the posture information of the subject and the position information of the object present in the visual field region, at least one of a dead angle region that cannot be grasped by the subject or a visual recognition region that is a region obtained by excluding the dead angle region from the visual field region.

4 Claims, 17 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 11,263,759 B2* | 3/2022 | Takagi ................... | G06T 7/215 |
| 2011/0051991 A1* | 3/2011 | Neuman ................. | G06T 7/194 |
| | | | 382/100 |
| 2012/0060177 A1* | 3/2012 | Stinson, III ............ | G06F 3/012 |
| | | | 725/12 |
| 2017/0045937 A1* | 2/2017 | Bostick ............... | G06F 3/04842 |
| 2017/0142343 A1* | 5/2017 | Kawai ................... | H04N 5/272 |
| 2021/0092326 A1* | 3/2021 | Li .......................... | H04N 23/90 |
| 2022/0345680 A1* | 10/2022 | Aoki ................... | H04N 23/633 |

FOREIGN PATENT DOCUMENTS

| | | | |
|---|---|---|---|
| JP | 2012213083 A | 11/2012 | |
| JP | 2017139689 A | 8/2017 | |

* cited by examiner

IMAGING SYSTEM AND METHOD FOR CALCULATING DEAD ANGLE AND VISUAL RECOGNITION REGIONS OF SUBJECTS

CROSS REFERENCE TO RELATED APPLICATION

The present application is a bypass continuation of International Patent Application PCT/JP2022/020742, filed on May 18, 2022, which is based upon and claims the benefit of priority from Japanese Patent Application No. 2021-106685, filed on Jun. 28, 2021, the disclosure of both of which are incorporated herein in its entirety by reference.

BACKGROUND

The present invention relates to an imaging system, an imaging method, and a program.

A technique for executing various kinds of control concerning a camera has been developed.

For example, Japanese Unexamined Patent Application Publication No. 2017-139689 discloses a technique for, even if any interchangeable lens is attached to a camera main body, a camera to acquire power consumption information of the interchangeable lens via a network using model number information of the interchangeable lens. This prevents power consumption of the camera from exceeding suppliable power of a power supply.

SUMMARY

When a camera images a predetermined space, in order to grasp a range that the camera images, it has been necessary to actually perform imaging with the camera and analyze a video imaged by the camera. Further, there has been a problem in that the imaging takes time depending on a place where the camera is provided and the number of provided cameras.

An imaging system according to an embodiment includes: an imaging unit configured to image a subject; a viewing angle acquiring unit configured to acquire viewing angle information of the subject using an image captured by the imaging unit; a subject information acquiring unit configured to acquire, using the image, position information and posture information of the subject and position information of an object present in a visual field region of the subject; and a region calculating unit configured to calculate, based on the viewing angle information, the position information, and the posture information of the subject and the position information of the object present in the visual field region, at least one of a dead angle region that cannot be grasped by the subject or a visual recognition region that is a region obtained by excluding the dead angle region from the visual field region.

An imaging method according to the embodiment is an imaging method of an imaging system executing: an imaging step for imaging a subject; a viewing angle acquiring step for acquiring viewing angle information of the subject using a captured image of the subject; a subject information acquiring step for acquiring, using the image, position information and posture information of the subject and position information of an object present in a visual field region of the subject; and a region calculating step for calculating, based on the viewing angle information, the position information, and the posture information of the subject and the position information of the object present in the visual field region, at least one of a dead angle region that cannot be grasped by the subject or a visual recognition region that is a region obtained by excluding the dead angle region from the visual field region.

A program according to the embodiment is a program for causing a computer to execute: an imaging step for imaging a subject; a viewing angle acquiring step for acquiring viewing angle information of the subject using a captured image of the subject; a subject information acquiring step for acquiring, using the image, position information and posture information of the subject and position information of an object present in a visual field region of the subject; and a region calculating step for calculating, based on the viewing angle information, the position information, and the posture information of the subject and the position information of the object present in the visual field region, at least one of a dead angle region that cannot be grasped by the subject or a visual recognition region that is a region obtained by excluding the dead angle region from the visual field region.

DETAILED DESCRIPTION

First Embodiment

A first embodiment of the present invention is explained below with reference to the drawings. In this embodiment, an imaging system is disclosed that calculates, using an image captured by an imaging unit, at least one of a dead angle region or an imagable region of a camera present in the image and superimposes information concerning the region on the image captured by the imaging unit as a virtual image to make the information displayable. Note that a "camera" set as an imaging target by the imaging system includes not only a normal camera including a camera housing but also any electronic equipment loaded with a camera function such as a smartphone and a tablet terminal and a robot loaded with the camera function. The camera may be a camera that performs imaging using not only visible light but also light other than the visible light such as infrared light.

Note that, in the following explanation, an "angle of view" indicates an angle at which a camera can catch light in an image. Whereas an "imaging region" indicates a region that the camera images when a region that the camera cannot grasp (a dead angle region) is absent, an "imagable region" indicates, when viewed from the camera, a region obtained by excluding the dead angle region from the imaging region.

As explained below, the imaging system can also execute peculiar processing concerning a general subject that is not only the camera. Concerning such a general subject, an angle at which the subject can catch light is described as a "viewing angle" and a region that the subject can see when a dead angle region is absent when viewed from the subject is described as a "visual field region". When viewed from the subject, a region obtained by excluding the dead angle region from the visual field region is described as a "visual recognition region". The terms "viewing angle", "visual field region", and "visual recognition region" are respectively descriptions as superordinate concepts of the terms "angle of view", "imaging region", and "imagable region".

Figure 1A:
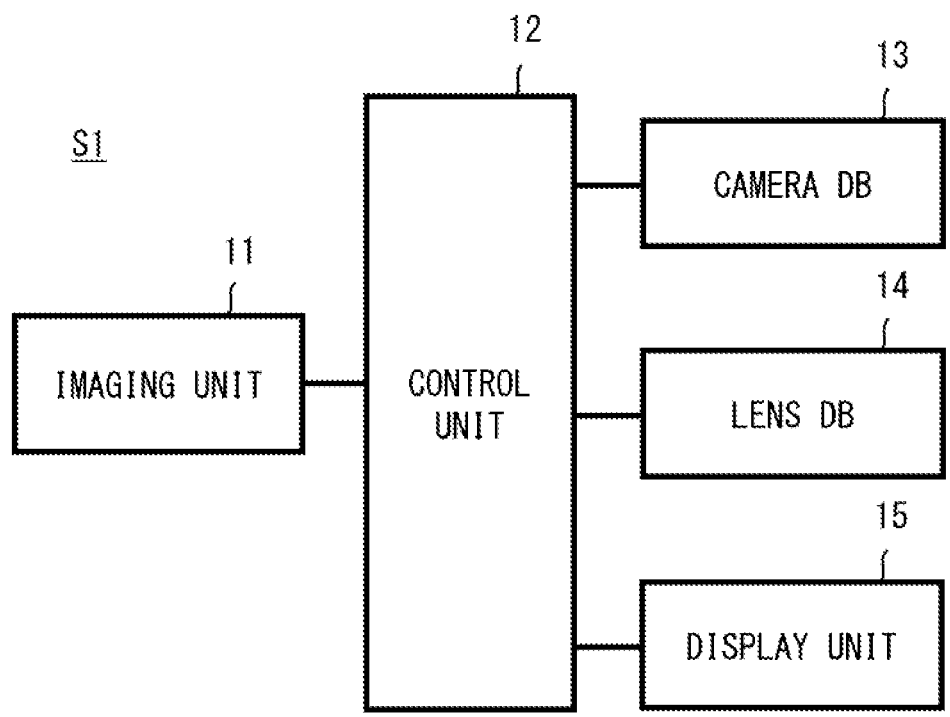
FIG. 1A is a block diagram showing a configuration example of an imaging system according to a first embodiment.

FIG. 1A is a block diagram showing a conceptual configuration example of an imaging system S1. The imaging system S1 includes an imaging unit 11, a control unit 12, a camera DB (database) 13, a lens DB 14, and a display unit 15. The imaging system S1 may be a centralized system configured by a single computer or may be a distributed system configured by a plurality of computers. Components of the imaging system S1 are explained below.

The imaging unit 11 captures a real image and outputs data of the captured image to the control unit 12. The imaging unit 11 includes, for example, one or a plurality of imaging elements. One or a plurality of images are captured by the imaging unit 11 and used for processing explained below. For example, the imaging unit 11 continuously performs imaging to capture a plurality of images. When the imaging is continuously performed, a position of a target camera does not move throughout the captured images. Note that the imaging unit 11 functions as a stereophonic depth camera (3D camera) capable of measuring a distance between the imaging unit 11 and the target camera or an object.

The control unit 12 calculates, using the image captured by the imaging unit 11 and data stored in the camera DB 13 and the lens DB 14, at least one of a dead angle region or an imagable region of a camera (hereinafter described as target camera as well) present in the captured image and causes the display unit 15 to display calculated information as a virtual image. Note that the target camera is one camera in the first embodiment.

Figure 1B:
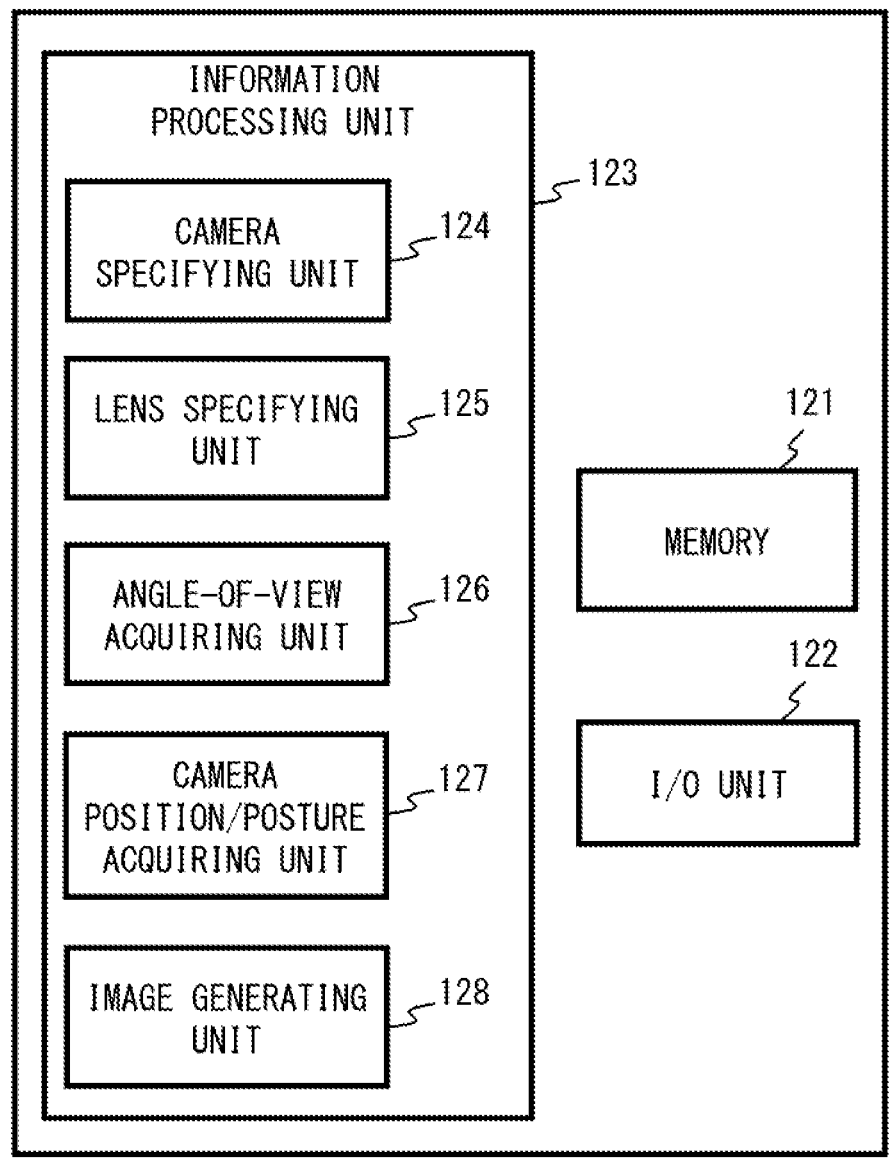
FIG. 1B is a block diagram showing a configuration example of a control unit according to the first embodiment.

FIG. 1B is a block diagram of the control unit 12. The control unit 12 includes a memory 121, an I/O (input/output) unit 122, and an information processing unit 123.

The memory 121 is configured by a volatile memory or a nonvolatile memory or a combination of the volatile memory and the nonvolatile memory. The memory 121 is not limited to one memory. A plurality of memories 121 may be provided. Note that the volatile memory may be, for example, a RAM (random access memory) such as a DRAM (dynamic random access memory) or an SRAM (static random access memory). The nonvolatile memory may be, for example, a PROM (programmable ROM), an EPROM (erasable programmable read only memory), or a flash memory.

The memory 121 is used to store one or more instructions. Here, the one or more instructions are stored in the memory 121 as a software module group. The information processing unit 123 can perform processing explained below by reading the one or more instructions from the memory 121 and executing the one or more instructions.

The I/O unit 122 is a hardware interface that executes input and output information from and to the outside of the control unit 12. In this embodiment, the control unit 12 is connected to the imaging unit 11, the camera DB 13, the lens DB 14, and the display unit 15 and performs input and output of information from and to the imaging unit 11, the camera DB 13, the lens DB 14, and the display unit 15 via the I/O unit 122 as appropriate.

The information processing unit 123 is configured by any processor or the like such as a CPU (central processing unit), an MPU (micro processing unit), an FPGA (field-programmable gate array), a DSP (digital signal processor), or an ASIC (application specific integrated circuit). Note that the memory 121 may include a memory incorporated in the information processing unit 123 in addition to a memory provided on the outside of the information processing unit 123.

The information processing unit 123 reads software (a computer program) from the memory 121 and executes the software to implement functions such as a camera specifying unit 124, a lens specifying unit 125, an angle-of-view acquiring unit 126, a camera position/posture acquiring unit 127, and an image generating unit 128. These functions are explained below.

The camera specifying unit 124 acquires the image captured by the imaging unit 11 and specifies parameters of a camera housing of the target camera present in the image. The camera specifying unit 124 refers to the camera DB 13 using specific information of the camera housing reflected in the captured image as a key to thereby specify the camera housing. Here, the specific information is at least one of model number information of the camera housing or a housing shape of the target camera but is not limited to the model number information and the housing shape.

The camera specifying unit 124 acquires and specifies the parameters stored in the camera DB 13 concerning the camera housing. In this example, the parameters of the camera housing are parameters indicating performance of a camera main body, which is not a lens, such as imaging element information of the camera housing, information concerning a lens attachment surface, and distance information of an imaging element. However, the parameters of the camera housing are not limited to this example if the parameters are parameters for specifying an angle of view of the target camera.

The lens specifying unit 125 acquires the image captured by the imaging unit 11 and specifies parameters of a lens (hereinafter described as target lens as well) attached to the target camera present in the image. The lens specifying unit 125 refers to the lens DB 14 using specific information of the target lens reflected in the captured image as a key to thereby specify the lens. Here, the specific information is at least one of model number information of the lens or a shape of the lens but is not limited to the model number information and the shape.

The lens specifying unit 125 acquires specification information stored in the lens DB 14 concerning the lens. The specification information to be acquired is information concerning the lens such as a range of a focal length that the lens can take and information concerning possibility of zoom. The lens specifying unit 125 refers to the acquired specification information of lens performance to thereby specify the focal length of the lens and the possibility of the zoom of the lens. When the zoom is impossible in the specifying target lens, the focal length of the lens is a specific value. The lens specifying unit 125 acquires the value to specify a focal length of the target lens at an imaging time.

On the other hand, when the zoom is possible in the target lens, the lens specifying unit 125 acquires, concerning the target lens, from the lens DB 14, specification information for specifying a zoom state (in this example, shape information of the lens and information concerning a state of a zoom ring). When the zoom is possible, the focal length of the lens is a value in a predetermined range. The focal length cannot be uniquely specified simply by specifying the lens. Therefore, the lens specifying unit 125 compares an actual state of the target lens reflected in the captured image and the specification information for specifying the zoom state and determines a zoom state of the target lens at an imaging time. Consequently, the lens specifying unit 125 uniquely specifies a focal length of the target lens at the imaging time from the value in the predetermined range. For example, the shape of the target lens and the state of the zoom ring are reflected in the captured image. The lens specifying unit 125 acquires information concerning the state by analyzing an image of a side surface portion of the lens in the captured image.

As explained above, the lens specifying unit 125 specifies the focal length of the lens at the imaging time. However, parameters that the lens specifying unit 125 specifies are not limited to the focal length of the lens at the imaging time if the parameters are parameters for specifying the angle of view of the target camera.

The angle-of-view acquiring unit 126 uses the parameters of the camera housing specified by the camera specifying unit 124 and the focal length of the lens at the imaging time specified by the lens specifying unit 125 to thereby calculate and acquire an angle of view at the imaging time of the target camera imaged by the imaging unit 11. Note that the angle of view may be, for example, an angle of view concerning one or more any types among a horizontal angle of view, a vertical angle of view, and a diagonal angle of view. In this example, the angle-of-view acquiring unit 126 calculates all of the angles of view described above to thereby calculate a view frustum (a square truncated pyramid) of the target camera.

The camera position/posture acquiring unit 127 (a subject information acquiring unit) acquires, using the image captured by the imaging unit 11, information concerning a coordinate (a position) and a posture of the target camera reflected in the captured image. Consequently, the camera position/posture acquiring unit 127 can specify in which position the target camera is present and in which direction the target camera faces at the imaging time. Further, the camera position/posture acquiring unit 127 can also specify a coordinate (position information) of a contour of an object reflected in the image.

The image generating unit 128 (a region calculating unit) integrates information concerning the view frustum of the target camera calculated by the angle-of-view acquiring unit 126, the information concerning the coordinate and the posture of the target camera acquired by the camera position/posture acquiring unit 127, and position information of the object (an obstacle) present in the visual field region of the target camera to calculate an imaging region of the target camera.

Figure 2:
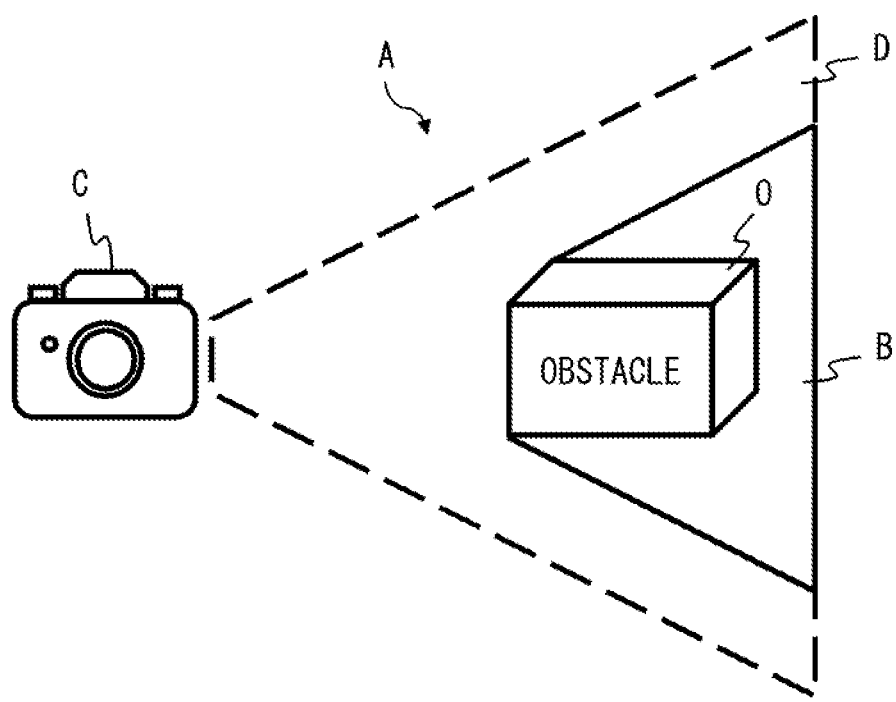
FIG. 2 is a schematic diagram illustrating a view frustum of a target camera according to the first embodiment.

FIG. 2 is a schematic diagram illustrating the view frustum of the target camera from a side surface of the view frustum. In FIG. 2, a view frustum of a target camera C extends from an imaging element of the target camera C to infinity. An obstacle O is present in a range of the view frustum. When the obstacle O is absent, an imaging region A in a real space of the target camera C can be decided by applying information concerning a coordinate and a posture of the target camera C to the imaging region A of the target camera C defined by the view frustum.

However, since the obstacle O (for example, a subject of the target camera C) is present in the real space in FIG. 2, a region B at a dead angle for the target camera C is present behind the obstacle O when viewed from the target camera C. Therefore, the image generating unit 128 detects the presence of the obstacle O in the imaging region A of the target camera C in the captured image to thereby calculate at least one of the dead angle region B in the imaging region A from the target camera C deriving from the obstacle O or an imagable region D that is a region obtained by excluding the dead angle region B from the imaging region A. The image generating unit 128 generates a superimposed image obtained by superimposing information concerning at least one of the calculated dead angle region B or the calculated imagable region D on a captured image. Note that it is assumed that the image generating unit 128 generates the superimposed image. However, not only this, but the image generating unit 128 may generate the information concerning at least one of the calculated dead angle region B or the calculated imagable region D as an image.

Note that the camera specifying unit 124 and the lens specifying unit 125 can determine presence or absence of the camera housing or the lens and specify model number information or a shape of the camera housing or the lens by executing publicly-known image analysis processing. The lens specifying unit 125 can also specify a zoom state of the lens by executing the publicly-known image analysis processing. Similarly, the camera position/posture acquiring unit 127 and the image generating unit 128 can calculate a coordinate and a posture of the target camera and detect presence of an obstacle and calculate a dead angle region or an imagable region by using publicly-known analysis processing. For example, an AI (artificial intelligence) technology such as deep learning can be used for the analysis processing.

These elements of the control unit 12 may be realized by a plurality of computers or the like connected by a network. Further, any calculation processing executed by the elements may be executed by a computer different from the imaging system S1. The control unit 12 may be configured to acquire a result of the execution.

The explanation is continued referring back to FIG. 1A. In the camera DB 13, for a plurality of cameras, model number information of camera housings, housing shapes, and parameters of the camera housings are stored in correlation with one another. In the camera DB 13, feature points indicating features of the housings are stored in order to distinguish shapes and postures of the housings. Further, in the camera DB 13, general-purpose parameters used when a specific camera cannot be specified are stored. The camera specifying unit 124 accesses the camera DB 13 and acquires parameter information as explained above.

In the lens DB 14, for a plurality of lenses, model number information, shapes, and specification information of the lenses are stored in correlation with one another. In the lens DB 14, feature points indicating features of the lenses are stored in order to distinguish shapes and postures of the lenses. As explained above, the specification information is information concerning the lenses such as ranges of focal lengths that the lenses can take and information concerning possibility of zoom. When the zoom is possible, specification information for specifying zoom states is further included as the specification information. Further, in the lens DB 14, general-purpose parameters used when a specific lens cannot be specified are also stored. The lens specifying unit 125 accesses the lens DB 14 and acquires parameter information as explained above.

Note that the camera DB 13 and the lens DB 14 may be connected to the control unit 12 through a network. For example, the camera DB 13 and the lens DB 14 may be databases of a so-called cloud type. Specifically, the camera DB 13 and the lens DB 14 may be HDDs (hard disk drives). When the target camera is a type such as a lens-integrated camera, the camera DB 13 and the lens DB 14 may be constructed as the same database such that the control unit 12 can collectively acquire parameters of a camera housing and parameters of a lens by a single access.

The display unit 15 is an interface such as a display or an AR (augmented reality) glass that displays the superimposed image generated by the image generating unit 128. For example, when the display unit 15 is the AR glass and the imaging unit 11 is imaging a direction visually recognized by a user in a state in which the user wears the AR glass, the user can view the superimposed image with the AR glass. As another example, the user may view a real space via the AR glass configured to be capable of transmitting light from the real space. In this case, the display unit 15 can reflect a virtual image showing at least one of a dead angle region or an imagable region in a position on the AR glass corresponding to a position of the region superimposed in the superimposed image. In this way, the display unit can visually highlight at least one of a range that can be imaged by the camera or a range that cannot be imaged by the camera and display the range to the user. Note that it is assumed that the display unit 15 displays the superimposed image generated by the image generating unit 128. However, not only this, but the display unit 15 only has to display information concerning at least one of the dead angle region B or the imagable region D as an image.

In the imaging system S1, an input unit such as a button or a touch panel for receiving input from the user may be provided. The user inputs, from the input unit, whether to display one or both of the dead angle region or the imagable region from the target camera explained above. The image generating unit 128 determines, based on the input, for the dead angle region and the imagable region from the target camera explained above, a target to be calculated and calculates at least one of the dead angle region or the imagable region. The image generating unit 128 generates a superimposed image obtained by superimposing information concerning at least one of the calculated dead angle region or the calculated imagable region on a captured image. The display unit 15 displays the superimposed image. The user may input, from the input unit, information concerning a posture of the target camera.

Figure 3A:
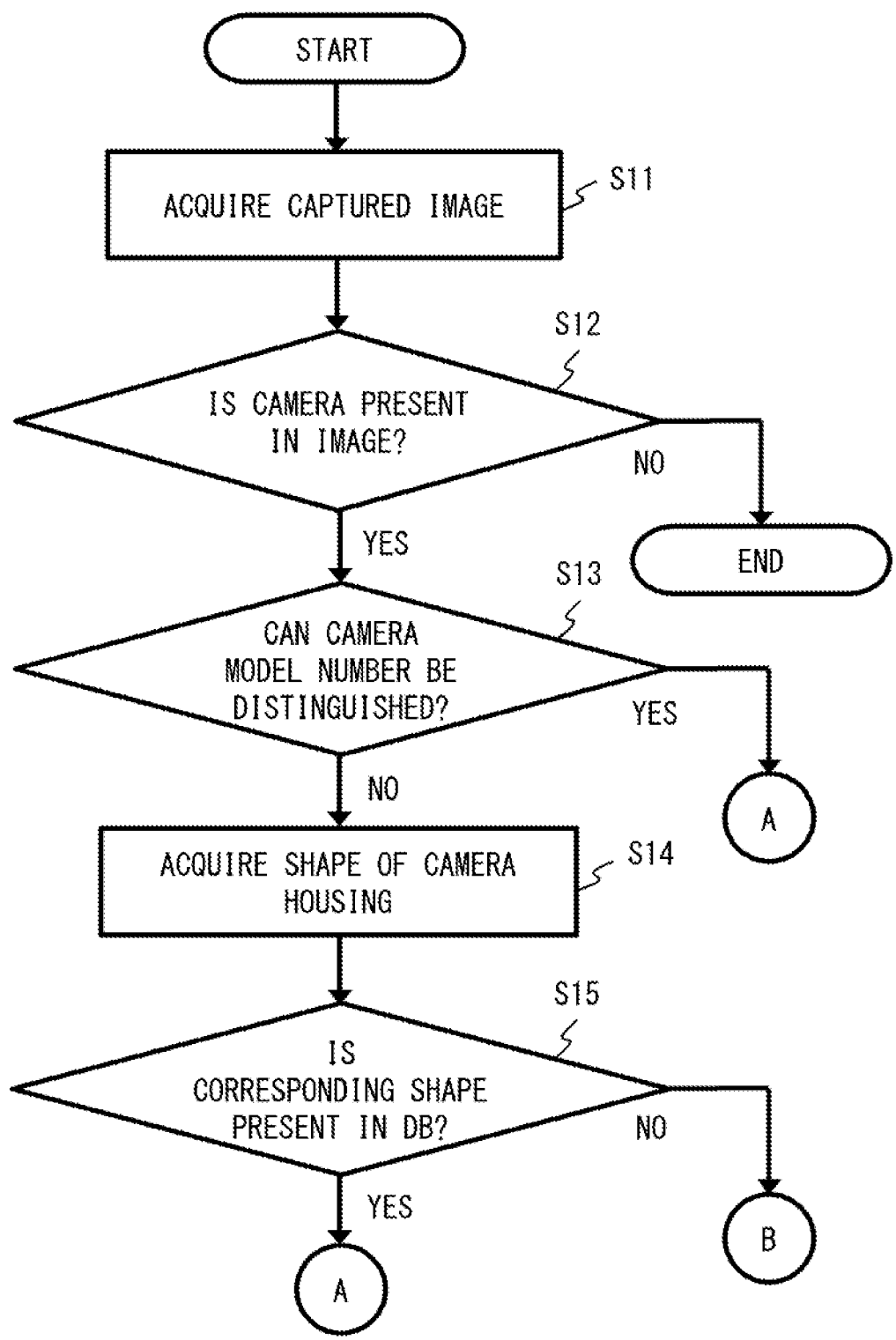
FIG. 3A is a flowchart showing an example of processing executed by a camera specifying unit according to the first embodiment.
Figure 3B:
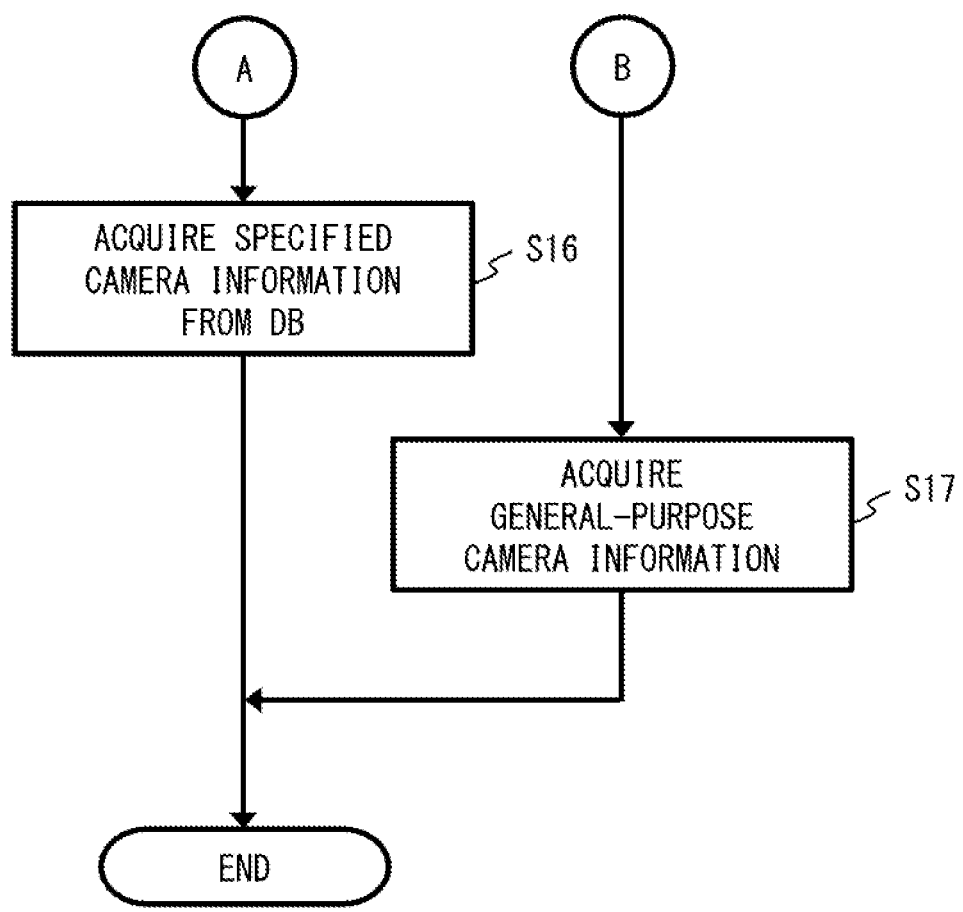
FIG. 3B is a flowchart showing the example of the processing executed by the camera specifying unit according to the first embodiment.

FIGS. 3A and 3B are flowcharts showing an example of processing for the camera specifying unit 124 specifying a housing of the target camera referring to the camera DB 13. Details of the processing of the camera specifying unit 124 are explained below with reference to FIGS. 3A and 3B.

First, the camera specifying unit 124 acquires an image captured by the imaging unit 11 (step S11). Subsequently, the camera specifying unit 124 determines whether a camera is present in the captured image (step S12). When a camera is absent in the captured image (No in step S12), the camera specifying unit 124 ends the processing and stays on standby until acquiring a captured image next.

When a camera is present in the captured image (Yes in step S12), the camera specifying unit 124 determines whether model number information of the camera is reflected in the captured image as character information, that is, whether the model number information can be distinguished (step S13). When model number information cannot be distinguished (No in step S13), the camera specifying unit 124 acquires, from the captured image, a shape of a camera housing reflected in the captured image (step S14). The camera specifying unit 124 refers to the camera DB 13 using the shape as a key to thereby determine whether the camera housing corresponding to the shape is present in the camera DB 13 (step S15). For example, the camera specifying unit 124 can execute the determination in step S15 by comparing feature points of the camera housing reflected in the captured image and feature points of the housings stored in the camera DB 13.

When the model number information can be distinguished (Yes in step S13) or when the acquired shape of the camera housing is present in the camera DB 13 (Yes in step S15), the camera specifying unit 124 acquires, as camera information, parameters present in the camera DB 13 and correlated with the distinguished model number information or the shape of the camera housing (step S16). The camera specifying unit 124 ends the processing in this way.

When the acquired shape of the camera housing is absent in the camera DB 13 (No in step S15), the camera specifying unit 124 acquires general-purpose parameters concerning the camera housing from the camera DB 13 as camera information (step S17). The camera specifying unit 124 ends the processing in this way.

Note that, in the camera DB 13, concerning at least any one of sizes, shapes, or structures of the camera housings, the camera housings may be schematically divided into a plurality of types and general-purpose parameters may be set for each of the types. For example, in the camera DB 13, types of cameras such as a digital camera, a single lens reflex camera, a mirrorless camera, and a smartphone may be set and general-purpose parameters may be set for each of the types. Consequently, even if a specific model of a camera cannot be specified, the camera specifying unit 124 can acquire parameters relatively close to actual parameters of the camera housing as camera information by comparing at least any one of a size, a shape, or a structure of a camera housing present in a captured image and such factors stored in the camera DB 13. Therefore, calculation of an imagable region explained below is more accurately executed.

The imaging system S1 may store the general-purpose parameters explained above in a storage unit (for example, the memory 121) on the control unit 12 side beforehand. When the processing explained above by the camera specifying unit 124 cannot be performed because of some reason, for example, because the camera DB 13 cannot be accessed, the camera specifying unit 124 may access the storage unit and execute the same processing as the processing explained above to acquire the stored general-purpose parameters as camera information. The general-purpose parameters may be one kind or the general-purpose parameters may be set for each of the types of the camera housings as explained above.

Figure 4A:
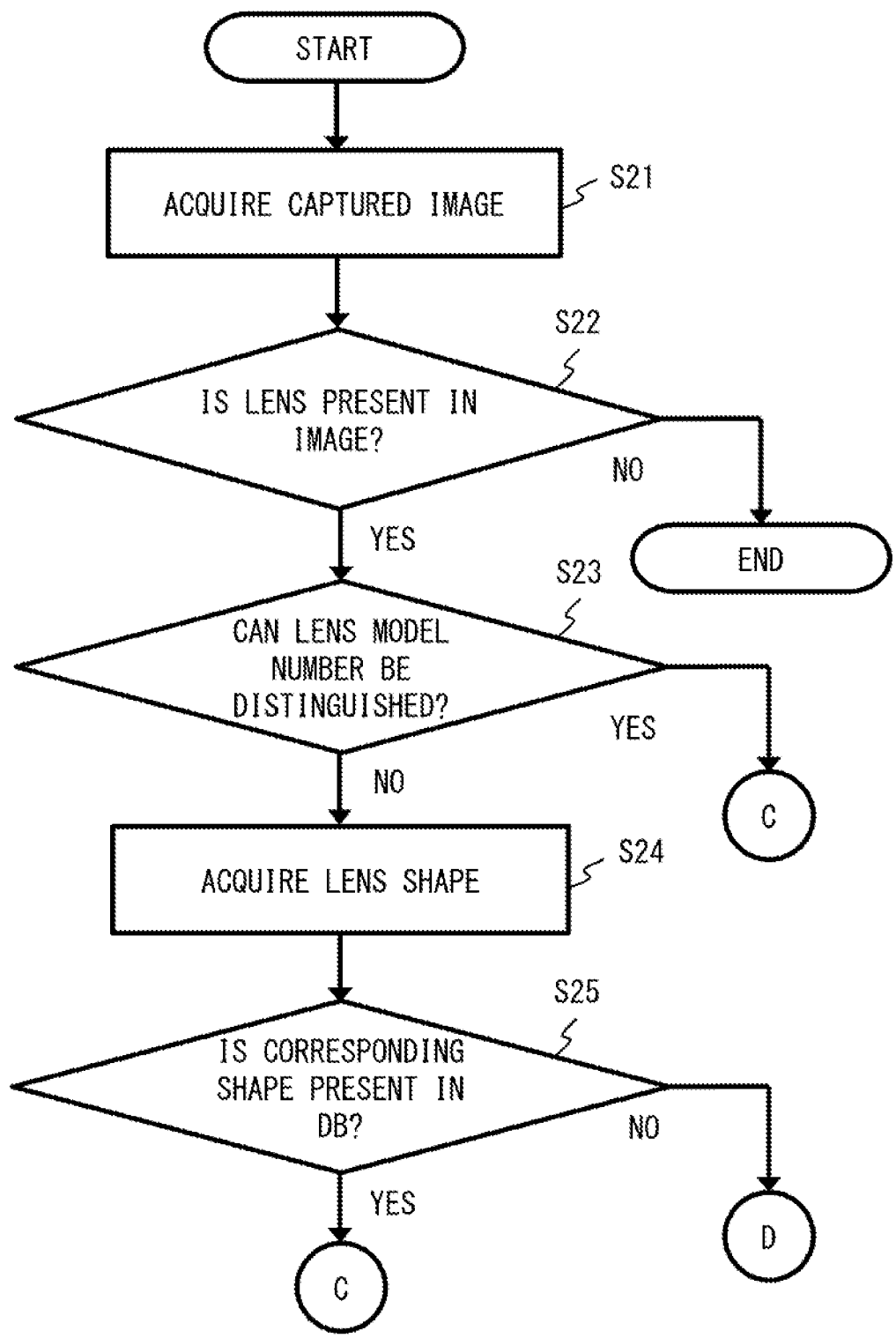
FIG. 4A is a flowchart showing an example of processing executed by a lens specifying unit according to the first embodiment.
Figure 4B:
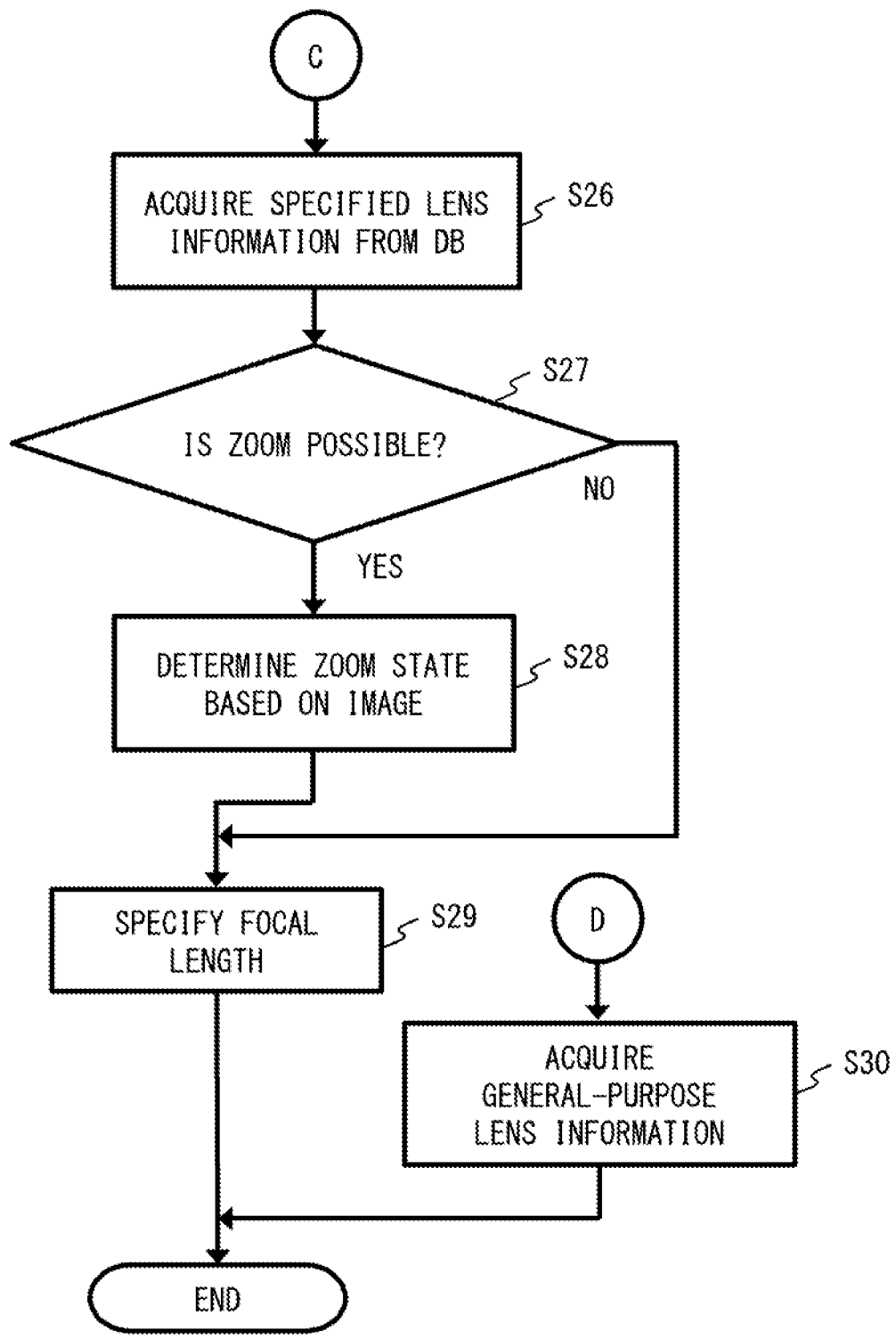
FIG. 4B is a flowchart showing the example of the processing executed by the lens specifying unit according to the first embodiment.

FIGS. 4A and 4B are flowcharts showing an example of processing for the lens specifying unit 125 specifying a lens of a target camera (hereinafter described as target lens as well) referring to the lens DB 14. Details of the processing of the lens specifying unit 125 are explained below with reference to FIGS. 4A and 4B.

First, the lens specifying unit 125 acquires an image captured by the imaging unit 11 (step S21). Subsequently, the lens specifying unit 125 determines whether a lens is present in the captured image (step S22). When a lens is absent in the captured image (No in step S22), the lens specifying unit 125 ends the processing and stays on standby until acquiring a captured image next.

When a lens is present in the captured image (Yes in step S22), the lens specifying unit 125 determines whether model number information of the target lens is reflected in the captured image as character information, that is, the model number information can be distinguished (step S23). When the model number information cannot be distinguished (No in step S23), the lens specifying unit 125 acquires, from the captured image, a shape of the lens reflected in the captured image (step S24). The lens specifying unit 125 refers to the lens DB 14 using the shape as a key to thereby determine whether the lens corresponding to the shape is present in the lens DB 14 (step S25). For example, the lens specifying unit 125 can execute the determination in step S25 by comparing feature points in the shape of the lens reflected in the captured image and feature points in shapes of the lenses stored in the camera DB 13.

When the model number information can be distinguished (Yes in step S23) or when the acquired shape of the lens is present in the lens DB 14 (Yes in step S25), the lens specifying unit 125 acquires, as lens information, specification information of lens performance present in the lens DB 14 and correlated with the distinguished model number information or the shape of the lens (step S26). The lens specifying unit 125 determines, based on the acquired specification information, whether the target lens can be zoomed (step S27).

When the target lens can be zoomed (Yes in step S27), the lens specifying unit 125 compares the acquired specification information of the lens performance and an actual state of the lens captured as an image to thereby determine a zoom state at an imaging time (step S28). The lens specifying unit 125 specifies a focal length of the lens at the imaging time based on the determined zoom state at the imaging time (step S29). Details of this is as explained above. When the target lens cannot be zoomed (No in step S27), the lens specifying unit 125 specifies, as a focal length of the lens, a focal length of the lens included in the acquired specification information of the lens performance (step S29).

Note that, when the acquired shape of the lens is absent in the lens DB 14 (No in step S25), the lens specifying unit 125 acquires the general-purpose parameters from the lens DB 14 as lens information (step S30). According to this processing, the lens specifying unit 125 specifies a focal length of the lens. The lens specifying unit 125 ends the processing in this way.

In the lens DB 14, concerning at least any one of sizes, shapes, or structures of the lenses, the lenses may be schematically divided into a plurality of types and general-purpose parameters may be set for each of the types. For example, in the lens DB 14, types (attributes) of lenses such as a zoom lens, a single focus lens, a standard lens, a wide angle lens, and a telephoto lens may be set and general-purpose parameters corresponding to the respective types may be set. Note that, as the types of the lenses, lenses obtained by combining a plurality of attributes such as a standard zoom lens, a wide angle zoom lens, and a high magnification zoom lens may be set. Consequently, even if a specific type of a lens cannot be specified, the lens specifying unit 125 can acquire parameters relatively close to actual parameters of the lens as lens information by comparing at least any one of a size, a shape, or a structure of a lens present in a captured image and such factors stored in the camera DB 13. Therefore, calculation of an imagable region explained below is more accurately executed.

The imaging system S1 may store the general-purpose parameters explained above in the storage unit (for example, the memory 121) on the control unit 12 side beforehand. When the processing explained above by the lens specifying unit 125 cannot be performed because of some reason, for example, because the lens DB 14 cannot be accessed, the lens specifying unit 125 may access the storage unit and execute the same processing as the processing explained above to acquire the stored general-purpose parameters as lens information. The general-purpose parameters may be one kind or the general-purpose parameters may be set for each of the types of the lenses as explained above.

Note that the determination processing in step S13 and the determination processing in S15 shown in FIG. 3A may be executed in opposite order. Similarly, the determination processing in step S23 and the determination processing in S25 shown in FIG. 4A may be executed in opposite order.

Figure 5A:
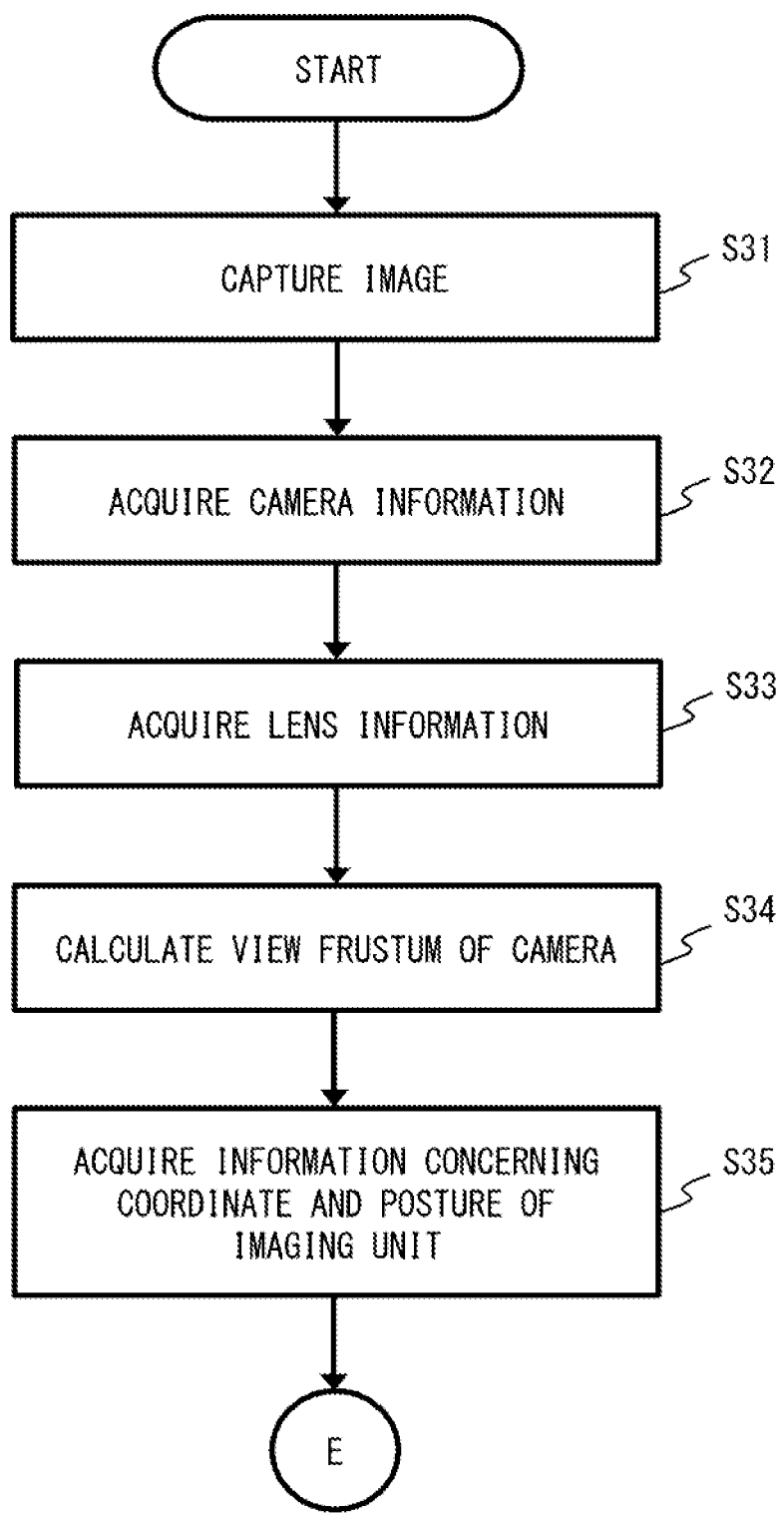
FIG. 5A is a flowchart showing an example of entire processing executed by the imaging system according to the first embodiment.
Figure 5B:
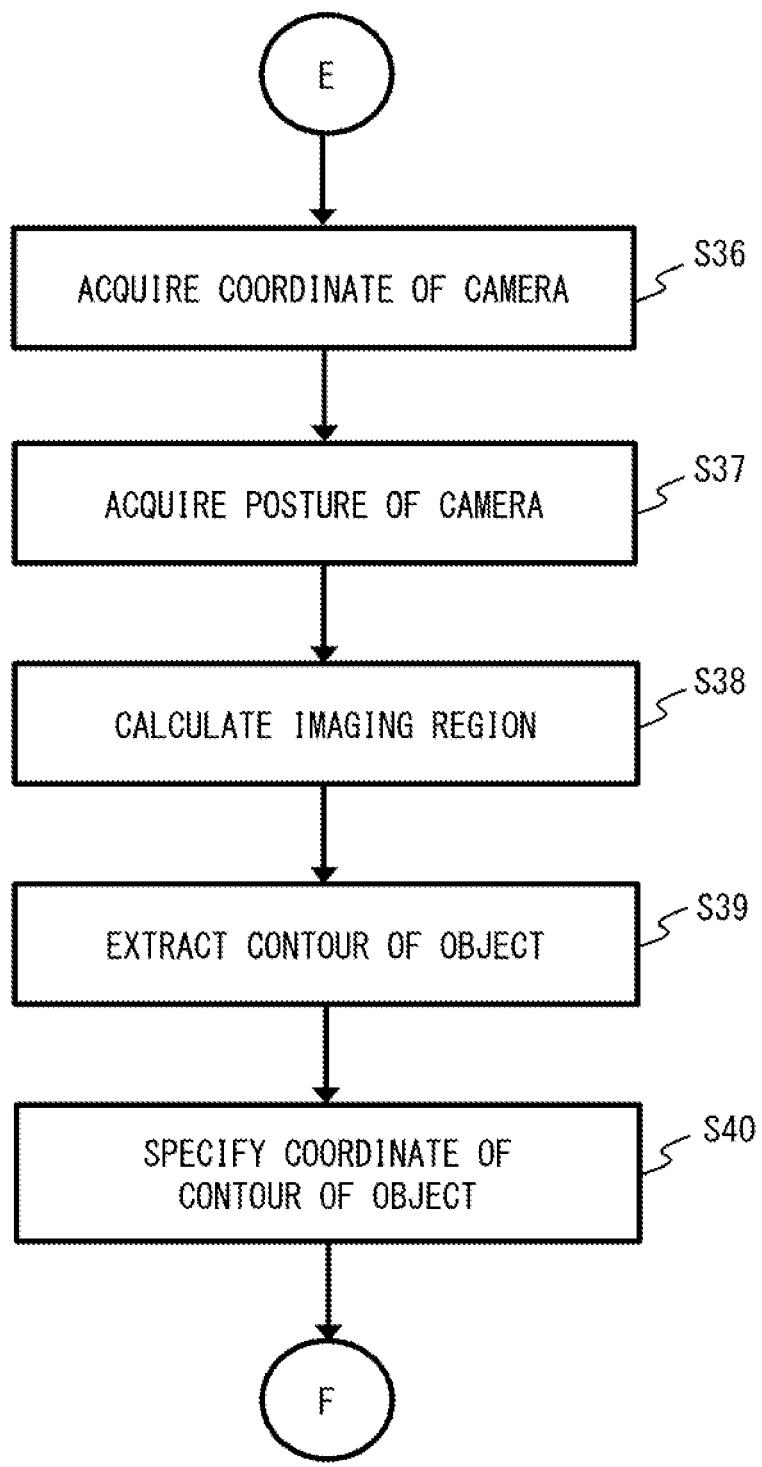
FIG. 5B is a flowchart showing the example of the entire processing executed by the imaging system according to the first embodiment.
Figure 5C:
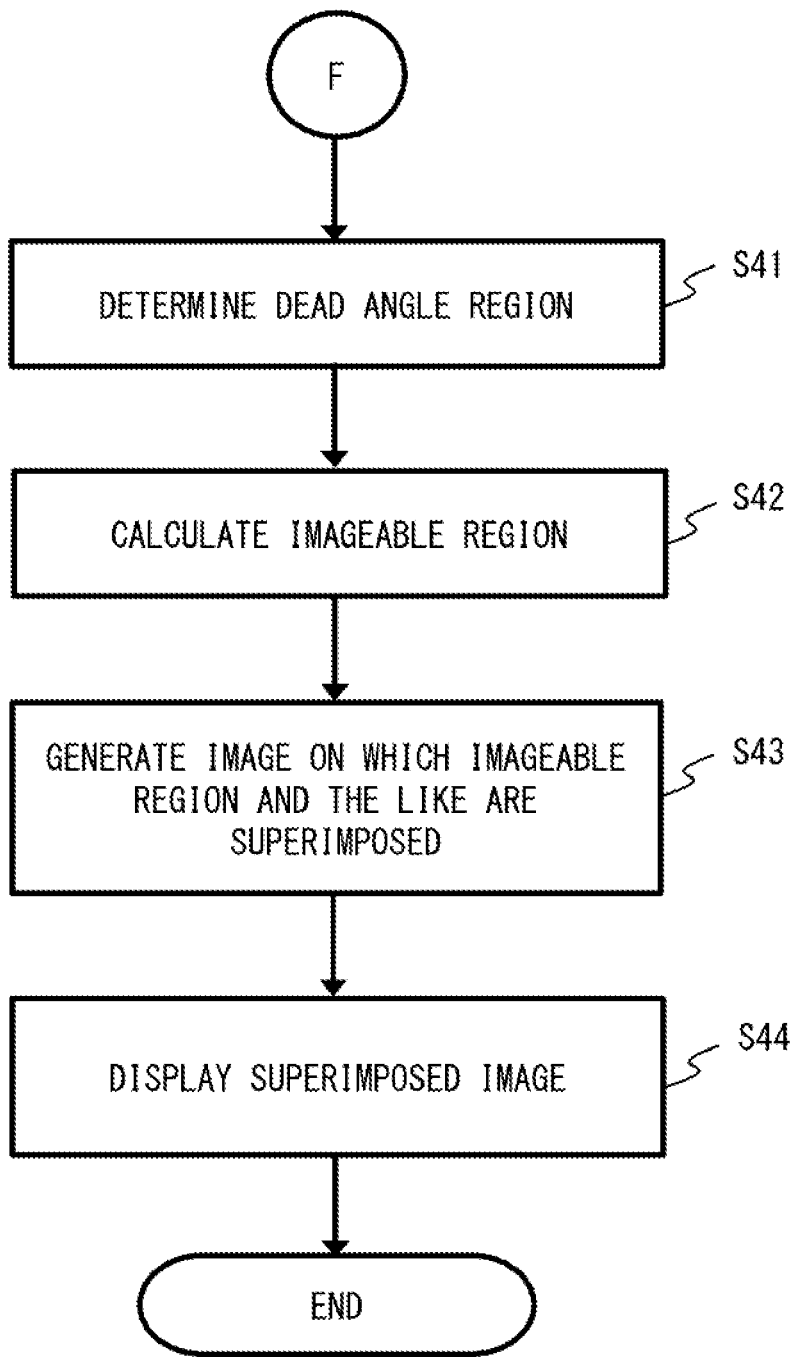
FIG. 5C is a flowchart showing the example of the entire processing executed by the imaging system according to the first embodiment.

FIGS. 5A to 5C are flowcharts showing an example of entire processing executed by the imaging system S1. The entire processing of the imaging system S1 is explained below with reference to FIGS. 5A to 5C.

First, the imaging unit 11 captures an image reflecting a target camera (step S31). Subsequently, the camera specifying unit 124 acquires the image captured by the imaging unit 11 to thereby acquire parameters concerning a camera housing of the target camera as camera information (step S32). Details of the processing in step S32 are as described in FIGS. 3A and 3B. The lens specifying unit 125 acquires an image captured by the imaging unit 11 to thereby acquire information concerning a focal length of the target lens as lens information (step S33). Details of the processing in step S33 are as described in FIGS. 4A and 4B.

Note that whichever of the processing in step S32 and the processing in step S33 may be executed first or both of the processing in step S32 and the processing in step S33 may be executed in parallel. When desired information cannot be acquired concerning at least one of steps S32 or S33, the imaging system S1 may determine that a camera capable of performing imaging is absent in the captured image and stop the subsequent processing.

The angle-of-view acquiring unit 126 calculates a view frustum of the target camera by calculating an angle of view at an imaging time of the target camera by using the parameters of the camera housing specified by the camera specifying unit 124 and the focal length of the lens at the imaging time specified by the lens specifying unit 125 (step S34).

In the imaging system S1, a coordinate and a posture of the imaging unit 11 are in a fixed state in advance. Information concerning the coordinate and the posture and information concerning a coordinate system are stored in the memory 121. The camera position/posture acquiring unit 127 reads and acquires the information (step S35).

The camera position/posture acquiring unit 127 acquires a coordinate of the target camera using the coordinate and a state of the posture (an imaging direction) of the imaging unit 11 acquired in step S35 and depth information of an image reflecting the target camera (step S36). The coordinate of the target camera and the coordinate of the imaging unit 11 are coordinates in the same coordinate system. Note that, when the lens specifying unit 125 has specified the target lens (that is, model number information of the target lens can be distinguished or the acquired shape of the target lens is present in the lens DB 14), the camera position/posture acquiring unit 127 may set a specified coordinate of the center of the lens as a coordinate of the target camera. When the lens specifying unit 125 has not specified a target lens, the camera position/posture acquiring unit 127 may set a coordinate of a portion of the target camera nearest to the imaging unit 11 as a coordinate of the target camera.

The camera position/posture acquiring unit 127 acquires, respectively from the camera DB 13 and the lens DB 14, feature points of shape information of each of the camera housing specified by the camera specifying unit 124 and the lens specified by the lens specifying unit 125. The camera position/posture acquiring unit 127 compares the acquired feature points of the camera housing and the lens and feature points of the target camera reflected in the captured image to acquire posture information of the target camera reflected in the captured image (step S37). Note that, when feature points of the shape information cannot be acquired from at least one of the camera DB 13 or the lens DB 14, in step S37, the camera position/posture acquiring unit 127 acquires posture information of the target camera acquired from the input unit of the imaging system S1. Note that whichever of the processing in step S37, the processing in steps S32 to S34, and the processing in steps S35 to S36 may be executed first or any ones of these kinds of processing may be executed in parallel.

The image generating unit 128 integrates information concerning the view frustum of the target camera calculated in step S34 and information concerning the coordinate and the posture of the target camera respectively acquired in steps S36 and S37 to calculate an imaging region in the target camera (step S38).

The camera position/posture acquiring unit 127 extracts a contour of an object (an obstacle) present in the imaging region of the target camera from the image captured by the imaging unit 11 (step S39). For example, the camera position/posture acquiring unit 127 detects an edge in the captured image and divides the region with the edge to thereby extract the contour of the object. A publicly-known technique can be applied to the contour extraction. In this way, the camera position/posture acquiring unit 127 detects presence of the obstacle in the imaging region of the target camera in the captured image.

The camera position/posture acquiring unit 127 specifies a coordinate (position information) of the contour of the object extracted in step S39 using information concerning the coordinate and the posture of the imaging unit 11 acquired in step S35 and the depth information of the image reflecting the target camera (step S40). Thereafter, the image generating unit 128 continuously draws straight lines passing the specified coordinate of the contour of the object and a coordinate of the target camera (for example, a coordinate of the center of the lens of the target camera) such that the straight lines pass the entire specified contour of the object. The image generating unit 128 determines that a region surrounded by the straight lines behind the object viewed from the target camera is a dead angle region in the imaging region from the target camera deriving from the object (the obstacle) (step S41). The image generating unit 128 further calculates an imagable region that is a region obtained by excluding the dead angle region determined in step S41 from the imaging region (step S42). The image generating unit 128 generates a superimposed image obtained by superimposing information concerning the calculated dead angle region and the calculated imagable region on the captured image (step S43). The image generating unit 128 outputs the generated superimposed image to the display unit 15. The display unit 15 displays the superimposed image (step S44).

Recently, information equipment has been greatly advanced according to spread and band widening of a wireless network environment besides the advance of a high-speed CPU (central processing unit) and a high-definition screen display technology, a technology of a small and light battery, and the like. As such information equipment, not only a smartphone, which is a representative example, but also a so-called wearable device has been spread. As such a wearable device, a large number of kinds of information equipment for visually recognizing a virtual reality world using an HMD (head mounted display) of an eyeglass type have been developed.

The imaging system S1 according to the present invention is applicable as, for example, such information equipment. As specific processing, the angle-of-view acquiring unit 126 acquires angle of view (view frustum) information of a camera, the camera position/posture acquiring unit 127 acquires position information and posture information of the camera and further acquires a coordinate of a contour of an object, and the image generating unit 128 calculates at least one of a dead angle region or an imagable region based on these kinds of information and generates a superimposed image in which information concerning the region is highlighted. At this time, simply by imaging a target camera with the imaging system S1, the camera specifying unit 124 and the lens specifying unit 125 can respectively acquire information concerning a camera housing and an attached lens from a captured image. Therefore, the user does not need to input information (for example, model number information) concerning the camera. The imaging system S1 can easily visualize the dead angle region and a visual recognition region of the camera.

For the user, the dead angle region and the visual recognition region of the camera are clearly presented on the virtual reality world by the imaging system S1. Therefore, the imaging system S1 can be applied to various uses. For example, the imaging system S1 can be applied to a use of photogrammetry for converting a captured image into a 3D (dimension) model and a use for, when a monitoring camera is provided in a certain space (for example, a room), finding a dead angle region of the monitoring camera for a crime prevention purpose.

Second Embodiment

In the first embodiment, an example in which one camera is provided as the subject is explained. However, a plurality of cameras may be provided as subjects. In a second embodiment, processing executed by the imaging system S1 in such a case is explained. Note that the configuration of the imaging system S1 is as shown in FIGS. 1A and 1B. About processing executed by the units of the imaging system S1, differences from the first embodiment are schematically explained. Explanation is omitted about details of other processing because the details are the same as the details in the first embodiment.

The camera specifying unit 124 acquires an image captured by the imaging unit 11 and specifies parameters of a camera housing for each of a plurality of target cameras present in the image. The camera specifying unit 124 refers to the camera DB 13 using specific information of camera housings reflected in the captured image as a key to thereby specify the respective camera housings. Concerning the camera housings, the camera specifying unit 124 acquires and specifies the parameters stored in the camera DB 13.

The lens specifying unit 125 acquires an image captured by the imaging unit 11 and specifies parameters of an attached lens for each of a plurality of target cameras present in the image. The lens specifying unit 125 refers to the lens DB 14 using specific information of lenses reflected in the captured image as a key to thereby specify the lenses.

The lens specifying unit 125 acquires specification information stored in the lens DB 14 concerning the lenses. For a target lens incapable of performing zoom, a focal length of a lens is a specific value. The lens specifying unit 125 acquires the value to specify a focal length of the lens at an imaging time. On the other hand, for a target lens capable of performing zoom, the lens specifying unit 125 acquires specification information for specifying a zoom state concerning the target lens from the lens DB 14. A focal length of a lens included in the specification information is a value in a predetermined range. The lens specifying unit 125 determines a zoom state of the lens at an imaging time to thereby uniquely specify a focal length of the lens at the imaging time from the value in the predetermined range. As explained above, the lens specifying unit 125 specifies focal lengths of the lenses at the imaging time.

The angle-of-view acquiring unit 126 uses the parameters of the camera housings specified by the camera specifying unit 124 and the focal lengths of the lenses at the imaging time specified by the lens specifying unit 125 to thereby calculate angles of view at the imaging time of the target cameras imaged by the imaging unit 11 to calculate view frustums of the target cameras.

The camera position/posture acquiring unit 127 uses an image captured by the imaging unit 11 to acquire information concerning coordinates and postures of the target cameras reflected in the captured image. Consequently, the camera position/posture acquiring unit 127 can specify in which positions the target cameras are present and in which directions the target cameras face at the imaging time. Further, the camera position/posture acquiring unit 127 also acquires position information of an object present in a visual field region of each of the target cameras.

The image generating unit 128 integrates information concerning the view frustums (square truncated pyramids) of the target cameras calculated by the angle-of-view acquiring unit 126, the information concerning the coordinates and the postures of the target cameras acquired by the camera position/posture acquiring unit 127, and the position information of the object (an obstacle) present in the visual field region of each of the target cameras to calculate an imaging region in each of the plurality of target cameras.

Figure 6:
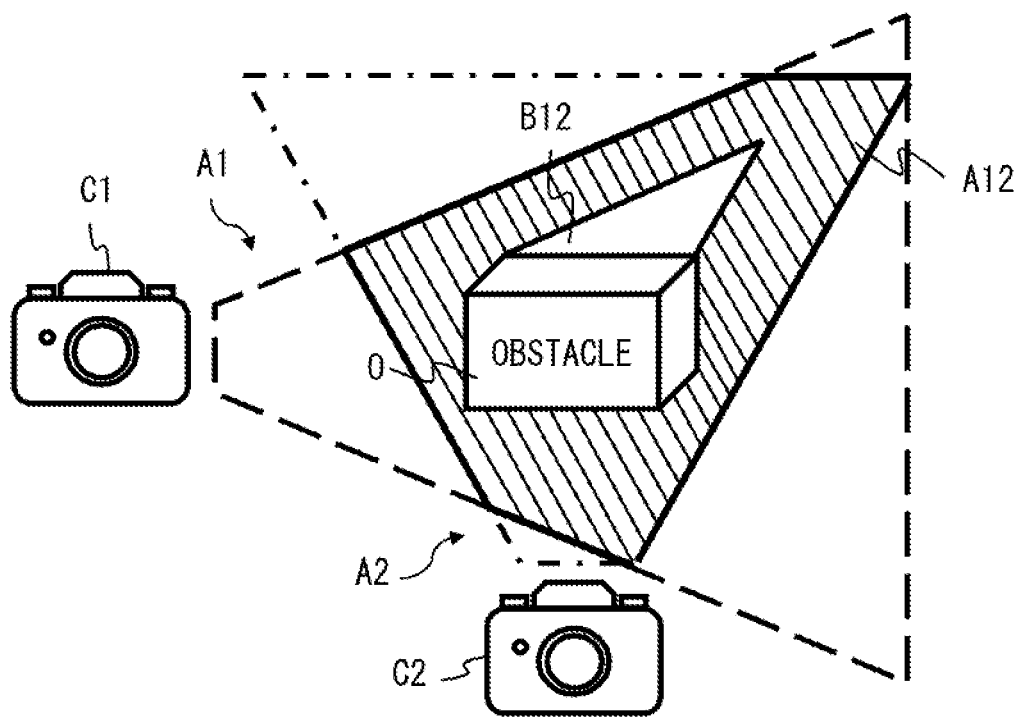
FIG. 6 is a schematic diagram illustrating view frustums of a plurality of target cameras according to a second embodiment.

FIG. 6 is a schematic diagram illustrating, when there are two target cameras, view frustums of the target cameras from side surfaces of the view frustums. In FIG. 6, an imaging region (a view frustum) of a target camera C1 is represented by A1 and an imaging region (a view frustum) of a target camera C2 is represented by A2. The imaging regions A1 and A2 are similar to the imaging region A in FIG. 2.

Here, since an obstacle O is present in a real space of FIG. 6, regions at dead angles are respectively present when viewed from the target cameras C1 and C2. In the target cameras C1 and C2, the imaging regions A1 and A2 are set to cover the dead angle regions of the target cameras C1 and C2 to some extent. However, a region B12 at a dead angle from both of the cameras is still present. The camera position/posture acquiring unit 127 detects the presence of the obstacle O in the imaging regions A1 and A2, whereby the image generating unit 128 calculates dead angle regions in the imaging regions. The image generating unit 128 calculates at least any one of four kinds of regions including an imagable region of each of the target cameras C1 and C2, a region A12 where imagable regions of the target cameras C1 and C2 are superimposed, a region imagable by only one target camera of the target cameras C1 and C2, or the region B12 at a dead angle from all of the target cameras C1 and C2. The image generating unit 128 generates a superimposed image obtained by superimposing information concerning the calculated region on a captured image. Note that, about the imagable region of each of the target cameras C1 and C2, the image generating unit 128 may display, on the superimposed image, as one region, a region obtained by adding up the imagable regions of the cameras or may display, on the superimposed image, the imagable regions to be identifiable for each of the cameras (for example, by color coding).

Note that the image generating unit 128 can switch, by determining an objective need of the user, which of the four kinds of regions explained above the image generating unit 128 calculates and displays. For example, the image generating unit 128 may determine a predetermined threshold number or more of (for example, three or more) cameras serving as subjects are present in a captured image. When the predetermined threshold number or more of cameras are present in the captured image, it is assumed that, as a motivation to dispose such a large number of cameras, the user provides the cameras to eliminate dead angles from the cameras because of a reason such as crime prevention. Therefore, in this case, the image generating unit 128 calculates at least a region (the region B12 in FIG. 6) at a dead angle from all the cameras and causes the display unit 15 to display the region.

As another example, at least when a region obtained by adding up the imaging regions (the imaging regions A1 and A2 in FIG. 6) of the cameras in the captured image is a predetermined threshold or more or a predetermined ratio or more in an entire region of the captured image, the image generating unit 128 may at least calculate a region at a dead angle from all the cameras and cause the display unit 15 to display the region.

In the imaging system S1, an input unit such as a button or a touch panel for receiving input from the user may be provided. The user inputs, from the input unit, one or a plurality of regions to be displayed among the four kinds of regions explained above. The image generating unit 128 determines, based on the input, for the four kinds of regions explained above, a target to be calculated and calculates at least any one of the four kinds of regions. The image generating unit 128 generates a superimposed image obtained by superimposing information concerning the calculated region on a captured image. The display unit 15 displays the superimposed image.

Figure 7A:
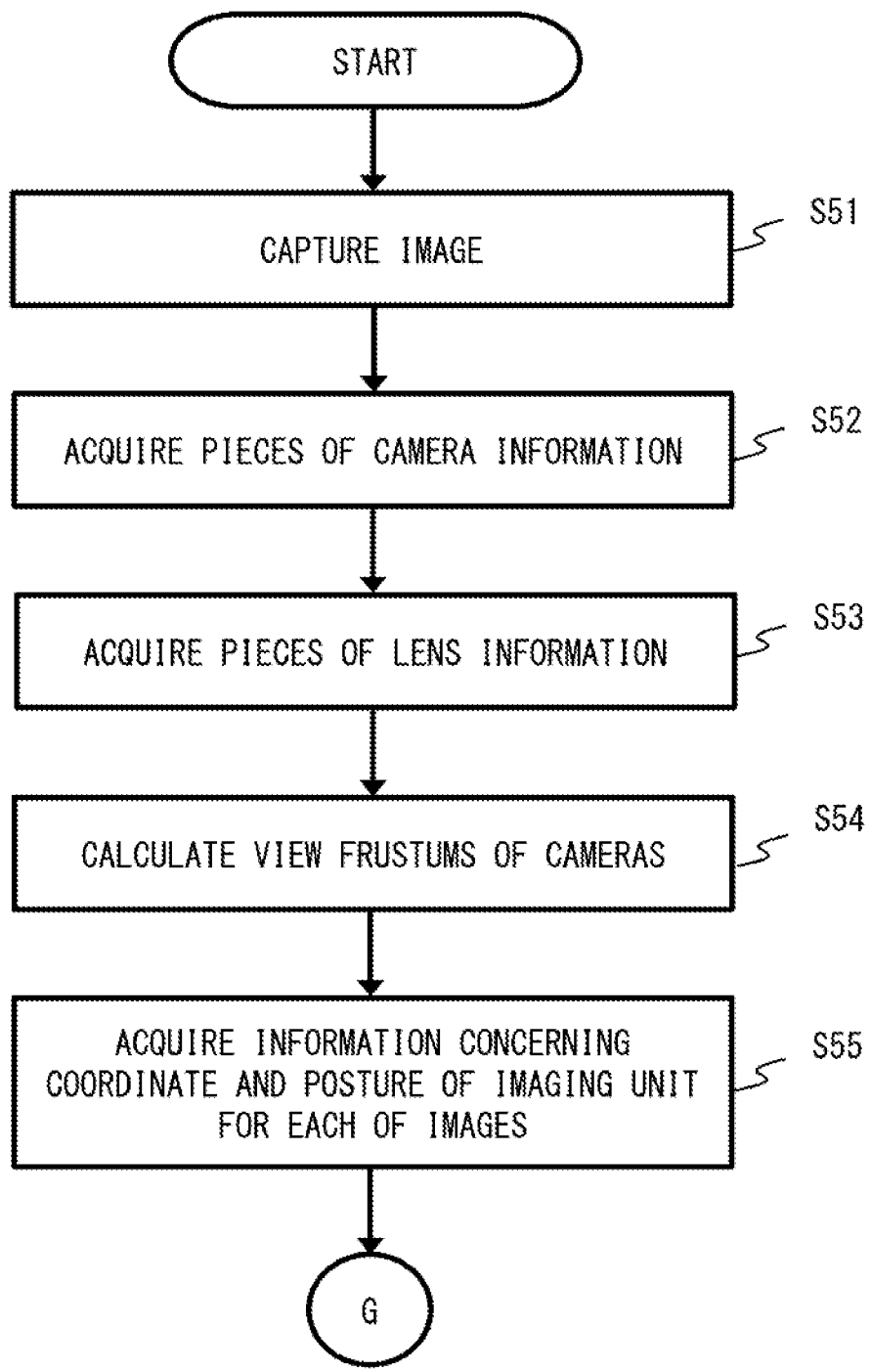
FIG. 7A is a flowchart showing an example of entire processing executed by an imaging system according to the second embodiment.
Figure 7B:
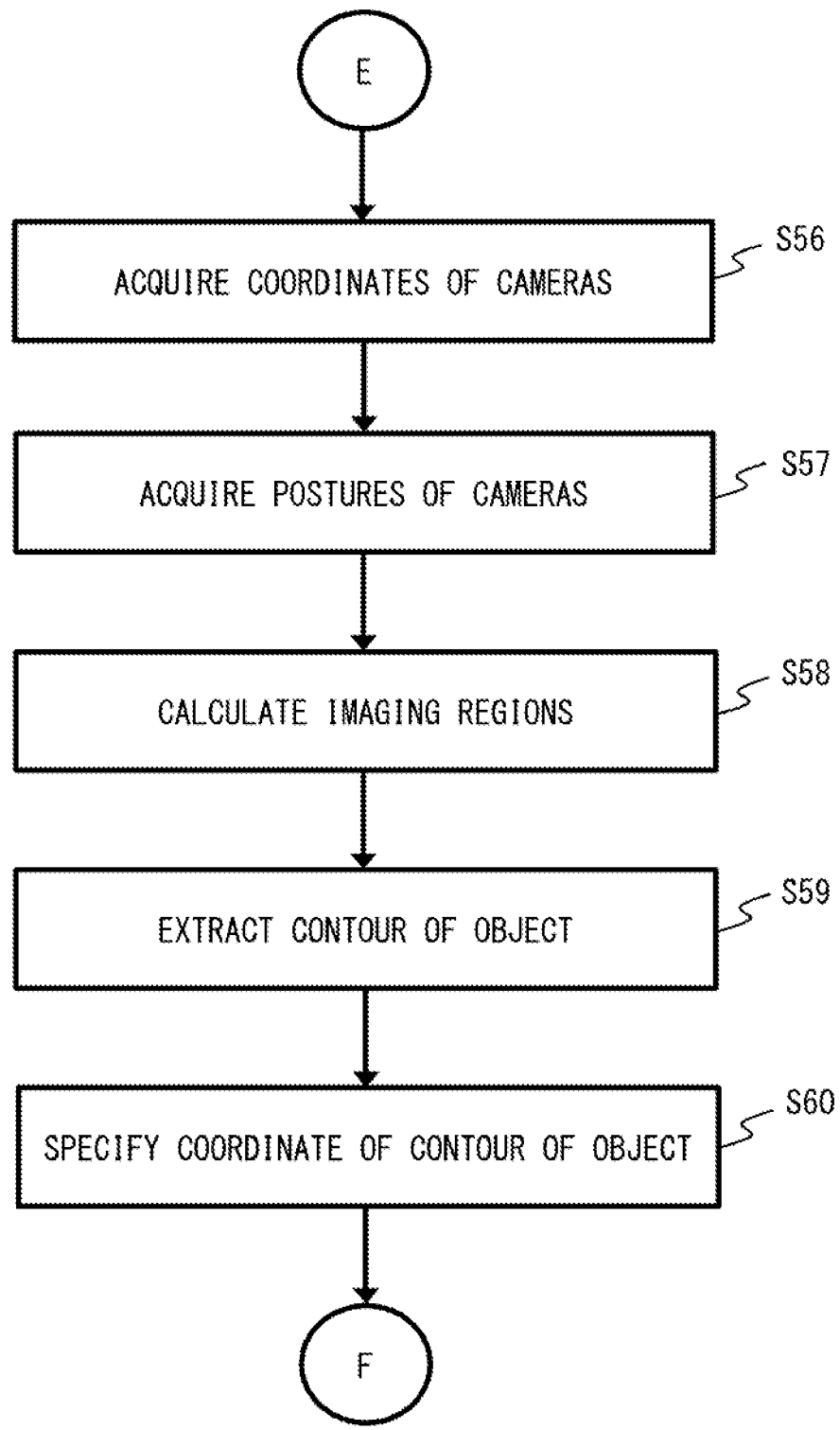
FIG. 7B is a flowchart showing the example of the entire processing executed by the imaging system according to the second embodiment.
Figure 7C:
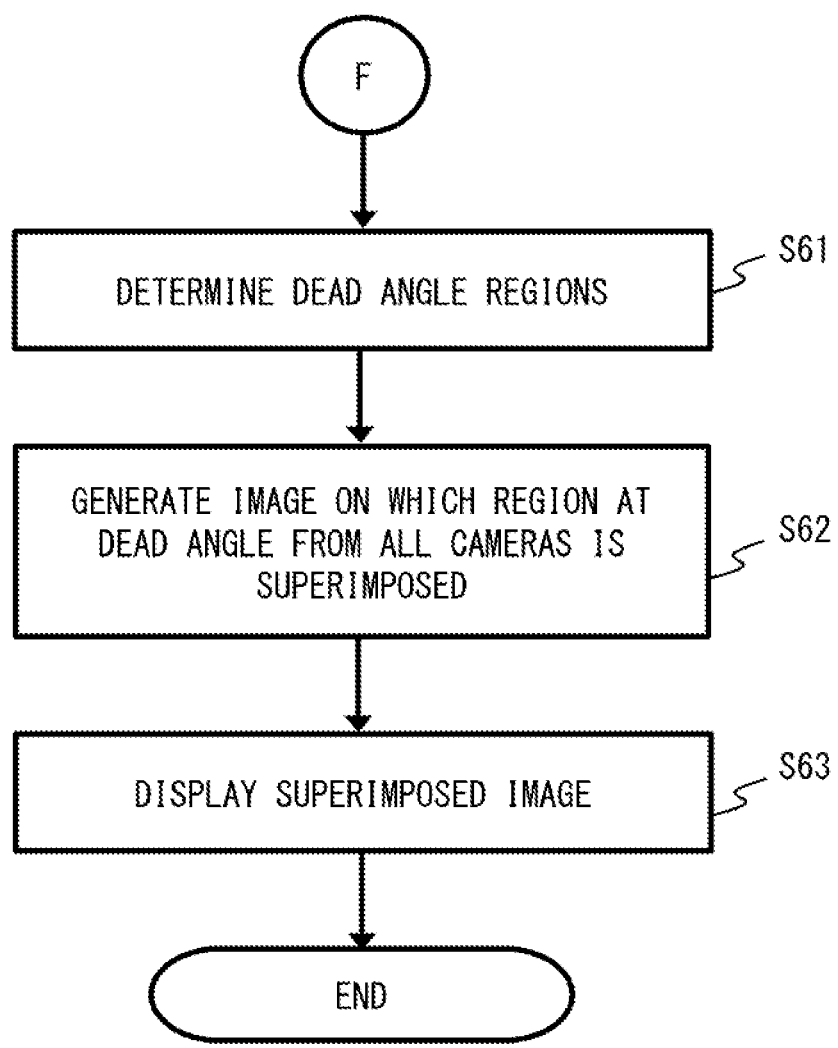
FIG. 7C is a flowchart showing the example of the entire processing executed by the imaging system according to the second embodiment.

FIGS. 7A and 7B are flowcharts showing an example of entire processing executed by the imaging system S1. The entire processing of the imaging system S1 is explained below with reference to FIGS. 7A and 7B. Note that explanation is omitted as appropriate for the points already explained with reference to FIGS. 5A to 5C.

First, the imaging unit 11 captures an image reflecting target cameras (step S51). Subsequently, the camera specifying unit 124 acquires the image captured by the imaging unit 11 to thereby acquire parameters concerning camera housings of the target cameras as camera information (step S52). The lens specifying unit 125 acquires the image captured by the imaging unit 11 to thereby acquire information concerning focal lengths concerning the target lenses as lens information (step S53).

The angle-of-view acquiring unit 126 calculates angles of view at an imaging time of the target cameras by using, for the target cameras, the parameters of the camera housings specified by the camera specifying unit 124 and the focal lengths of the lenses at the imaging time specified by the lens specifying unit 125. Consequently, the angle-of-view acquiring unit 126 calculates view frustums of the target cameras (step S54).

The camera position/posture acquiring unit 127 reads and acquires, from the memory 121, information concerning a coordinate system and information concerning a coordinate and a posture of the imaging unit 11 for each of images (step S55). The camera position/posture acquiring unit 127 acquires coordinates of the target cameras using the coordinate and a state of the posture (an imaging direction) of the imaging unit 11 acquired in step S55 and depth information of the image reflecting the target cameras (step S56).

The camera position/posture acquiring unit 127 compares acquired feature points of the camera housings and the lenses and feature points of the target cameras reflected in the captured image to acquire posture information of the target cameras reflected in the captured image (step S57).

The image generating unit 128 integrates information concerning the view frustums of the target cameras calculated in step S54 and information concerning the coordinates and the postures of the target cameras respectively acquired in steps S56 and S57 to calculate imaging regions in the target cameras (step S58).

The camera position/posture acquiring unit 127 extracts, from the image captured by the imaging unit 11, a contour of an object (an obstacle) present in the imaging regions of the target cameras (step S59). The camera position/posture acquiring unit 127 specifies a coordinate (position information) of the contour of the object using information concerning the coordinate and the posture of the imaging unit 11 acquired in step S55 and the depth information of the image reflecting the target cameras (step S60).

The image generating unit 128 continuously draws straight lines passing the specified coordinate of the contour of the object and coordinates of the target cameras (for example, coordinates of the centers of the lenses of the target cameras) such that the straight lines pass the entire specified contour of the object. The image generating unit 128 determines that a region surrounded by the straight lines behind the object viewed from the target cameras is a dead angle region in the imaging regions from the target cameras deriving from the object (the obstacle) (step S61). The image generating unit 128 specifies a region at a dead angle from all the target cameras by using a determination result in step S61 and generates an image on which the region is superimposed (step S62). Note that a calculation and display target region may be at least any one of an imagable region of each of the target cameras, a region where imagable regions of two or more target cameras are superimposed, or a region imagable by only one target camera among the plurality of target cameras. Alternatively, the calculation and display target region may include at least any one of these regions and a region at a dead angle from all the target cameras. The image generating unit 128 outputs the generated superimposed image to the display unit 15. The display unit 15 displays the superimposed image (step S63).

As explained above, the image generating unit 128 of the imaging system S1 can calculate, for the plurality of target cameras reflected in the captured image, at least any one of the imagable region of each of the target cameras, the region where the imagable regions of the target cameras are superimposed, the region imagable by only any one target camera, or the dead angle region from all the target cameras. The image generating unit 128 can generate a superimposed image obtained by superimposing information concerning the calculated region on an image and cause the display unit 15 to display the superimposed image. Therefore, it is possible to cause the imaging system S1 to easily visualize dead angle regions and visual recognition region of cameras.

Third Embodiment

An imaging system may capture a plurality of images of a camera serving as a subject from at least one of different places or different directions to thereby more accurately and stereoscopically specify an imaging region of a target camera and generate a three-dimensional superimposed image based on the imaging region.

Figure 8:
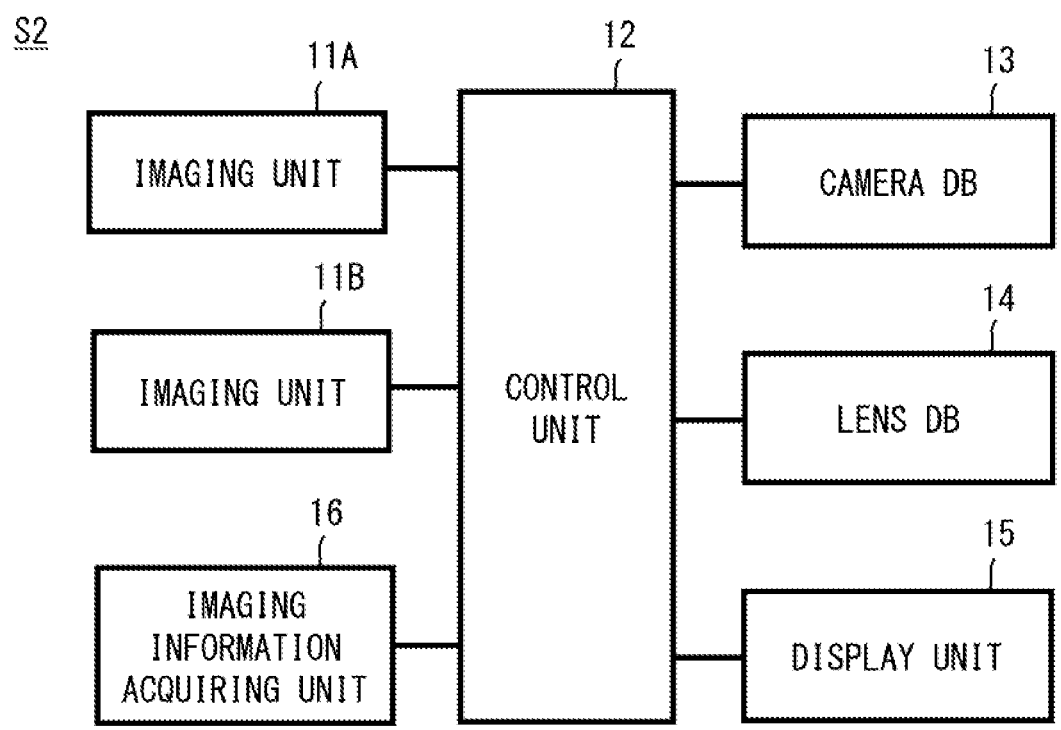
FIG. 8 is a block diagram showing a configuration example of an imaging system according to a third embodiment.

FIG. 8 is a block diagram showing a conceptual configuration example of an imaging system S2. The imaging system S2 further includes an imaging information acquiring unit 16 with respect to the imaging system S1. The imaging system S2 includes a plurality of imaging units 11 (11A and 11B) as components for capturing a plurality of images of a camera serving as a subject from at least one of different places or different directions. The imaging units 11A and 11B image the same subject from at least one of different places or different directions.

When the imaging unit 11 images the camera serving as the subject from a plurality of different places, the imaging information acquiring unit 16 acquires imaging position information indicating in which positions on a real space the imaging unit 11 is present at respective imaging times and imaging posture information indicating what kinds of posture states the imaging unit 11 takes at the respective imaging times. The imaging position information includes, for example, a value indicating at least any one of a coordinate position, speed, acceleration, or a direction of the speed of the imaging unit 11 in a three-dimensional orthogonal coordinate system. Note that changes in the direction of the speed and the posture may be expressed as yaw, pitch, and roll. The imaging posture information may be expressed using a quaternion. The imaging information acquiring unit 16 may acquire the imaging position information using a satellite positioning system such as a GPS (global positioning system).

The units of the control unit 12 execute the same processing as the processing in the second embodiment for each of a plurality of captured images captured by the imaging unit 11 to thereby calculate an imaging region in each of a plurality of target cameras. Here, since the plurality of target cameras are not moving throughout the captured images, an image in which positions of the target cameras are fixed is generated as a superimposed image. Note that, in step S55, the camera position/posture acquiring unit 127 acquires imaging position information and imaging posture information from the imaging information acquiring unit 16.

Note that units from the camera specifying unit 124 to the camera position/posture acquiring unit 127 of the control unit 12 may compare, for the plurality of target cameras reflected in different captured images, at least one of positions or shapes of the plurality of target cameras to thereby determine whether the target cameras indicate the same camera or indicate different cameras. The image generating unit 128 can generate, based on a result of the determination, a superimposed image in which the target cameras are disposed on a space in the same positions as positions on the captured image.

The image generating unit 128 calculates at least any one of four kinds of regions including an imagable region of each of the target cameras, a region where imagable regions of the target cameras are superimposed, a region imagable by only one target camera among the plurality of target cameras, or a dead angle region from all the target cameras. The image generating unit 128 generates a superimposed image obtained by superimposing information concerning the calculated region on a captured image. The image generating unit 128 superimposes the information concerning the calculated region on an image three-dimensionally represented by combining a plurality of captured images to generate a three-dimensional superimposed image. The display unit 15 displays the superimposed image in a form of at least one of VR (virtual reality) or AR (augmented reality). The superimposed image is displayed to a user in a state in which a distance between the imaging unit 11 and the target camera or an object is reflected on the superimposed image.

As explained above, the image generating unit 128 can three-dimensionally generate a superimposed image using the imaging position information and the imaging posture information acquired by the imaging information acquiring unit 16. In other words, the imaging system S2 is capable of specifying a plurality of target cameras present in a space from a continuously captured plurality of images, combining information concerning the specified target cameras, and presenting the information to the user as more stereoscopic information.

Note that the units of the control unit 12 may execute the same processing as the processing in the first embodiment for each of a plurality of captured images captured by the imaging unit 11 to thereby calculate an imaging region in one target camera. Thereafter, the image generating unit 128 calculates at least one of a dead angle region in the imaging region of the target camera in the captured image or an imagable region that is a region obtained by excluding the dead angle region from the imaging region. The image generating unit 128 superimposes information concerning the calculated region on an image three-dimensionally represented by combining the plurality of captured images to generate a three-dimensional superimposed image. The image generating unit 128 outputs the generated superimposed image to the display unit 15. The display unit 15 displays the superimposed image. In this way as well, the imaging system S2 can calculate a region and generate a superimposed image.

In particular, when executing the processing in step S39 in FIG. 5B (the extraction of a contour), the imaging system S2 needs to extract feature points necessary for specifying a contour of the object viewed from the target camera. At this time, since the imaging system S2 includes the plurality of imaging units 11 and images the object from different places or different directions, the imaging system S2 can image the entire contour of the object viewed from the target camera. Note that, when not all of the necessary feature points have been successfully extracted in one imaging, the imaging system S2 further images the object from different places or different directions to thereby image the entire contour of the object viewed from the target camera.

However, the imaging system S2 may include only one imaging unit 11. The imaging unit 11 may capture a plurality of images of a camera serving as a subject from at least one of different places or different directions. The feature points necessary for specifying the object explained above are imaged by the imaging system S2 in this way, whereby the imaging system S2 can calculate a region and generate a superimposed image.

Fourth Embodiment

As the technique for visualizing an invisible thing in the virtual reality world, the imaging systems described in the first to third embodiments generates a video obtained by visualizing a dead angle region and an imagable region for a camera that is a subject. However, a thing other than the camera may be a target as the subject. For example, a human can also be set as the subject.

Figure 9A:
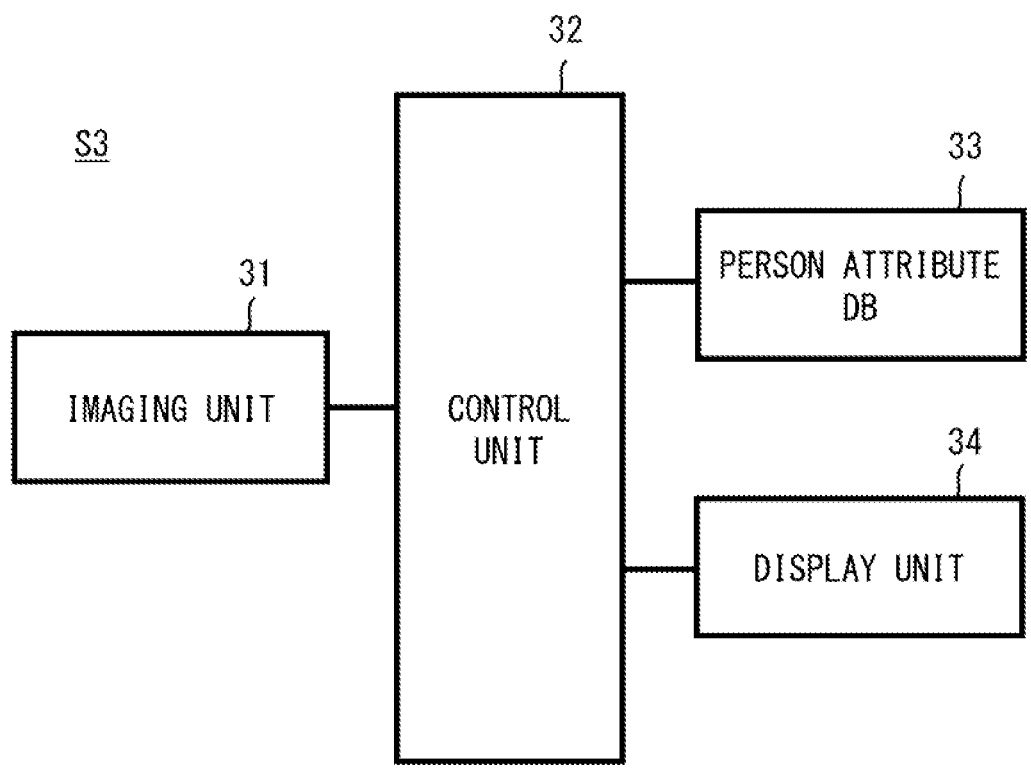
FIG. 9A is a block diagram showing a configuration example of an imaging system according to a fourth embodiment.

FIG. 9A is a block diagram showing a schematic configuration example of an imaging system S3 according to the fourth embodiment. The imaging system S3 includes an imaging unit 31, a control unit 32, a person attribute DB (database) 33, and a display unit 34. In the following explanation, explanation is omitted as appropriate about the similarities to the first embodiment.

Like the imaging unit 11, the imaging unit 31 captures one or a plurality of images and outputs data of the captured images to the control unit 32.

The control unit 32 calculates, using the images captured by the imaging unit 31 and data stored in the person attribute DB 33, at least one of a dead angle region or a visual field region of a person (hereinafter described as target person as well) present in the captured images and causes the display unit 34 to display calculated information as a virtual image.

Figure 9B:
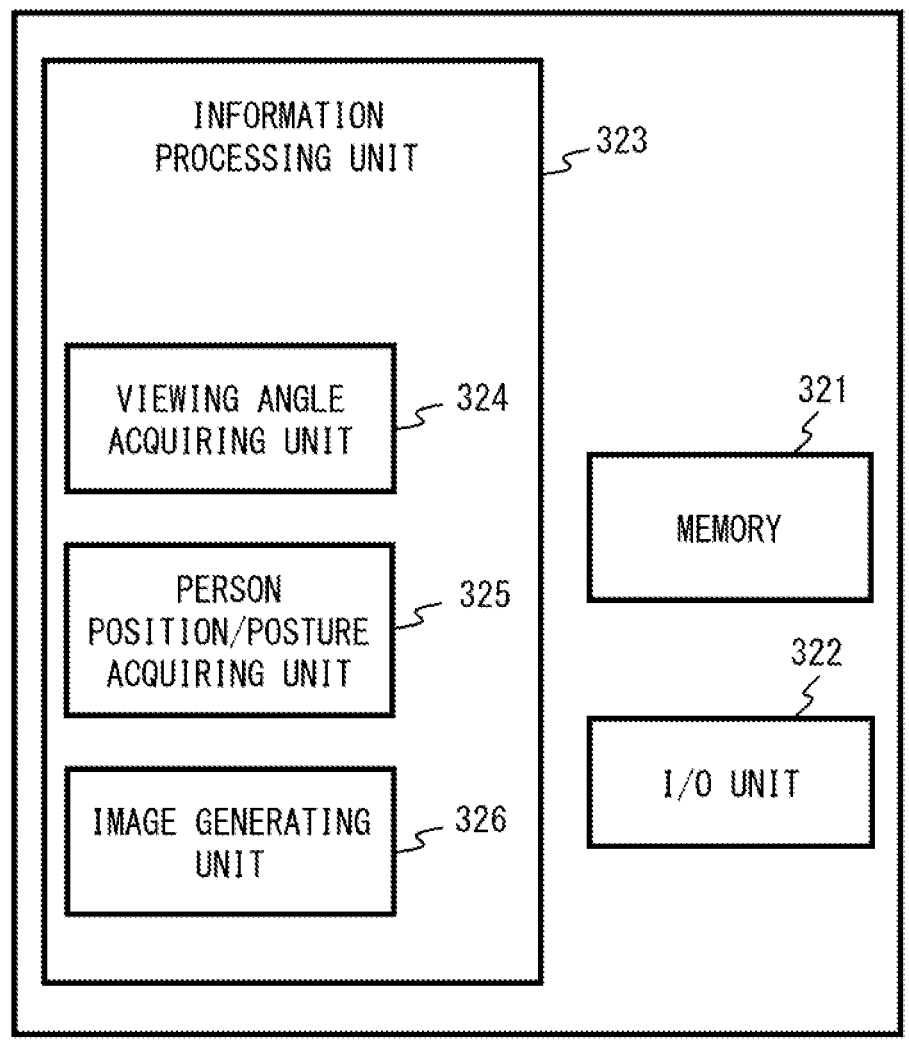
FIG. 9B is a block diagram showing a configuration example of a control unit according to the fourth embodiment.

FIG. 9B is a block diagram of the control unit 32. The control unit 32 includes a memory 321, an I/O unit 322, and an information processing unit 323. Since the memory 321 and the I/O unit 322 execute the same processing as the processing executed by the memory 121 and the I/O unit 122 according to the first embodiment, explanation of the memory 321 and the I/O unit 322 is omitted.

As in the first embodiment, the information processing unit 323 is configured by any processor or the like and reads software (a computer program) from the memory 321 and executes the software to implement functions such as a viewing angle acquiring unit 324, a person position/posture acquiring unit 325, and an image generating unit 326. These functions are explained below.

The viewing angle acquiring unit 324 acquires an image captured by the imaging unit 11, analyzes the image, and extracts, for a person (hereinafter, a target person) present in the image, from the captured image, information indicating an attribute for determining a viewing angle of the target person. The information is, for example, shaping of a face or an age of the target person. A publicly-known technology such as AI can be used for this image analysis. The viewing angle acquiring unit 324 refers to the person attribute DB 33 using the information as a key to thereby acquire a viewing angle of the target person. In this example, the viewing angle acquiring unit 324 acquires viewing angles in horizontal, vertical, and diagonal directions to thereby acquire information concerning a view cone of the target person (equivalent to the view frustum of the camera).

The person position/posture acquiring unit 325 calculates, using the image captured by the imaging unit 31, a coordinate (position information) of the target person and a posture of the target person in the captured image. Consequently, the person position/posture acquiring unit 325 can specify in which position the target person is present and in which direction the target person faces at an imaging time. In particular, in order to calculate a visual field region in the target person, the person position/posture acquiring unit 325 calculates a position of the eyes of the target person as the position information. Further, the person position/posture acquiring unit 325 can also specify a coordinate (position information) of a contour of an object reflected in the image.

The image generating unit 326 integrates information concerning the view cone of the target person calculated by the viewing angle acquiring unit 324, information concerning the coordinate and the posture of the target person acquired by the person position/posture acquiring unit 325, and the position information of the object (an obstacle) present in the visual field region of the target person to calculate the visual field region in the target person. The person position/posture acquiring unit 325 detects presence of the obstacle in the visual field region of the target person, whereby the image generating unit 326 calculates at least one of a dead angle region in the visual field region from the target person deriving from the obstacle or a visual recognition region that is a region obtained by excluding the dead angle region from the visual field region. The image generating unit 326 generates a superimposed image obtained by superimposing information concerning the calculated region on the captured image. Details of this is as explained in the first embodiment. The image generating unit 326 outputs the superimposed image to the display unit 34.

The explanation is continued referring back to FIG. 9A. In the person attribute DB 33, information concerning a viewing angle of a person is stored in correlation with information indicating an attribute of the person. The viewing angle acquiring unit 324 accesses the person attribute DB 33 and acquires information concerning a viewing angle as explained above. The display unit 34 is the same display unit as the display unit 15. Explanation of the display unit 34 is omitted.

As explained above, the imaging system S3 can easily visualize a dead angle region and a visual recognition region of a person. The imaging system S3 can be applied to the second embodiment as well. In this case, the image generating unit 326 can calculate, for a plurality of target persons reflected in a captured image, at least any one of a visual recognition region of each of the target persons, a region where visual recognition regions of the target persons are superimposed, a visual recognition region of only any one target person, or a dead angle region from all the target persons. Similarly, the imaging system S3 can also generate a three-dimensional superimposed image by being applied to the third embodiment as well. Note that the imaging system S3 can also be applicable to animals other than the human.

Note that the present invention is not limited to the embodiments explained above and can be changed as appropriate in a range not departing from the gist. For example, when cameras and persons are mixed and reflected in an image captured by the imaging system, the imaging system may calculate dead angle regions and imagable regions of the cameras and dead angle regions and visual recognition regions of the persons as in the embodiments explained above and display the dead angle regions and the imagable regions of the cameras and the dead angle regions and the visual recognition regions of the persons on a superimposed image. When a plurality of subjects such as cameras or persons have been imaged, the user may designate, via the input unit, whether the subjects are set as targets of calculation of a region and display on the superimposed image. The imaging system executes the same processing as the processing in the embodiments explained above on one or a plurality of subjects designated as the targets of calculation of a region and display on the superimposed image and displays a region highlighted in the superimposed image.

As explained above, the one or the plurality of processors included in the imaging system in the embodiments explained above executes one or a plurality of programs including an instruction group for causing a computer to perform an algorithm explained with reference to the drawings. According to this processing, the processing explained in the embodiments can be implemented.

The programs include an instruction group (or software codes) for, when being read into the computer, causing the computer to perform the one or more functions explained in the embodiments. The programs may be stored in a non-transitory computer-readable medium or a substantial storage medium. Not as limitation but as an example, the computer-readable medium or the substantial storage medium includes a random-access memory (RAM), a read-only memory (ROM), a flash memory, a solid-state drive (SSD), or other memory technologies, a CD-ROM, a digital versatile disk (DVD), a Blu-ray (registered trademark) disk, or other optical disk storages, and a magnetic cassette, a magnetic tape, a magnetic disk storage, or other magnetic storage devices. The programs may be transmitted on a transitory computer-readable medium or a communication medium. Not as limitation but as an example, the transitory computer-readable medium or the communication medium includes an electric propagation signal, an optical propagation signal, an acoustic propagation signal, or propagation signals of other forms. The programs can take, for example, a form as an application.

The present invention is explained above with reference to the embodiments. However, the present invention is not limited by the above description. Various changes that those skilled in the art can understand within the scope of the present invention can be applied to the configurations and the details of the present invention. According to the embodiment, it is possible to provide an imaging system, an imaging method, and a program capable of easily calculating at least one of a dead angle region or a visual recognition region from a subject.

The present invention can be used in, for example, an imaging system that images a subject.

What is claimed is:

1. An imaging system comprising:
 a camera configured to capture a subject;
 at least one memory; and
 at least one processor configured to read and execute software from the memory, the processor executing processes corresponding to:
   an imaging unit configured to image the subject;
   a viewing angle acquiring unit configured to acquire viewing angle information of the subject using an image captured by the imaging unit;

a subject information acquiring unit configured to acquire, using the image, position information and posture information of the subject and position information of an object present in a visual field region of the subject; and
a region calculating unit configured to calculate, based on the viewing angle information, the position information, and the posture information of the subject and the position information of the object present in the visual field region, at least one of a dead angle region that exists behind the object as viewed from the subject and that the subject cannot grasp or a visual recognition region that is a region obtained by excluding the dead angle region from the visual field region.

2. The imaging system according to claim 1, wherein
the imaging unit images a plurality of subjects including the subject,
the viewing angle acquiring unit acquires viewing angle information of each of the plurality of subjects using the image captured by the imaging unit,
the subject information acquiring unit acquires, using the image, position information and posture information of each of the plurality of subjects and position information of an object present in a visual field of each of the subjects, and
the region calculating unit calculates, based on the viewing 30 angle information, the position information, and the posture information of each of the plurality of subjects and the position information of the object present in the visual field region of each of the subjects, at least any one of the visual recognition region of each of the subjects, a region where the visual recognition regions of the subjects are superimposed, a region visually recognizable by only any one subject, or the dead angle region from all the subjects.

3. An imaging method of performed by at least one processor of an imaging system executing:
imaging a subject;
acquiring viewing angle information of the subject using a captured image of the subject;
acquiring, using the image, position information and posture information of the subject and position information of an object present in a visual field region of the subject; and
calculating, based on the viewing angle information, the position information, and the posture information of the subject and the position information of the object present in the visual field region, at least one of a dead angle region that exists behind the object as viewed from the subject and that the subject cannot grasp or a visual recognition region that is a region obtained by excluding the dead angle region from the visual field region.

4. A non-transitory computer readable medium storing a program for causing at least one processor of a computer to execute:
imaging a subject;
acquiring viewing angle information of the subject using a captured image of the subject;
acquiring, using the image, position information and posture information of the subject and position information of an object present in a visual field region of the subject; and
calculating, based on the viewing angle information, the position information, and the posture information of the subject and the position information of the object present in the visual field region, at least one of a dead angle region that exists behind the object as viewed from the subject and that the subject cannot grasp or a visual recognition region that is a region obtained by excluding the dead angle region from the visual field region.

* * * * *